(12) United States Patent  
Haynes et al.

(10) Patent No.: US 9,329,263 B2  
(45) Date of Patent: May 3, 2016

(54) IMAGING SYSTEM AND METHOD

(75) Inventors: Mark Spencer Haynes, Bloomfield Hills, MI (US); Mahta Moghaddam, La Canada, CA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 484 days.

(21) Appl. No.: 13/479,120

(22) Filed: May 23, 2012

(65) Prior Publication Data

US 2013/0135136 A1   May 30, 2013

Related U.S. Application Data

(60) Provisional application No. 61/488,865, filed on May 23, 2011.

(51) Int. Cl.
| | |
|---|---|
| *G01S 13/00* | (2006.01) |
| *G01S 13/89* | (2006.01) |
| *G01S 13/88* | (2006.01) |
| *G01S 7/41* | (2006.01) |
| *G01S 7/40* | (2006.01) |

(52) U.S. Cl.
CPC .............. *G01S 13/89* (2013.01); *G01S 7/412* (2013.01); *G01S 13/88* (2013.01); *G01S 2007/4082* (2013.01)

(58) Field of Classification Search
CPC ......... G01S 13/88; G01S 13/89; G01S 7/412; G01S 2007/4082

USPC .................................................... 342/22
See application file for complete search history.

(56) References Cited

U.S. PATENT DOCUMENTS

| | | | |
|---|---|---|---|
| 5,588,032 A * | 12/1996 | Johnson et al. | 378/8 |
| 2004/0155810 A1* | 8/2004 | Witten | 342/22 |
| 2005/0102343 A1* | 5/2005 | Tsang et al. | 708/446 |
| 2007/0035438 A1* | 2/2007 | Witten | 342/22 |
| 2007/0241753 A1* | 10/2007 | Sodickson et al. | 324/307 |
| 2010/0213939 A1* | 8/2010 | Sodickson et al. | 324/309 |

OTHER PUBLICATIONS

Matthys M. Botha, "Solving the volume integral equations of electromagnetic scattering", Journal of Computational Physics, vol. 218, pp. 141-158, 2006.*

(Continued)

*Primary Examiner* — Frank J McGue  
(74) *Attorney, Agent, or Firm* — Reising Ethington P.C.

(57) ABSTRACT

An imaging system and method in which the system carries out the method which includes the steps of: (a) determining an incident field, (b) using the incident field and a volume integral equation (VIE) to determine a total field, (c) predicting voltage ratio measurement at a receiving antenna by using the volume integral equation (VIE), wherein the VIE includes a vector Green's function, (d) collecting voltage ratio measurements from one or more receiving antennas, and (e) comparing the predicted voltage ratio measurements to the collected voltage ratio measurements to determine one or more properties of the object being evaluated. An S-parameter based inverse scattering method using the vector Green's function and VIE as its core is also described.

11 Claims, 30 Drawing Sheets

(56) References Cited

OTHER PUBLICATIONS

Haynes et al., "Vector Green's Function for S-Parameter Measurements of the Electromagnetic Volume Integral Equation", IEEE Transactions on Antennas and Propagation, vol. 60, No. 3, Mar. 2012.*

C.T. Tai, "Vector Green Functions versus Dyadic Greens Functions", Radiation Laboratory, Department of Electrical Engineering and Computer Science, University of Michigan, Nov. 1994.*

* cited by examiner

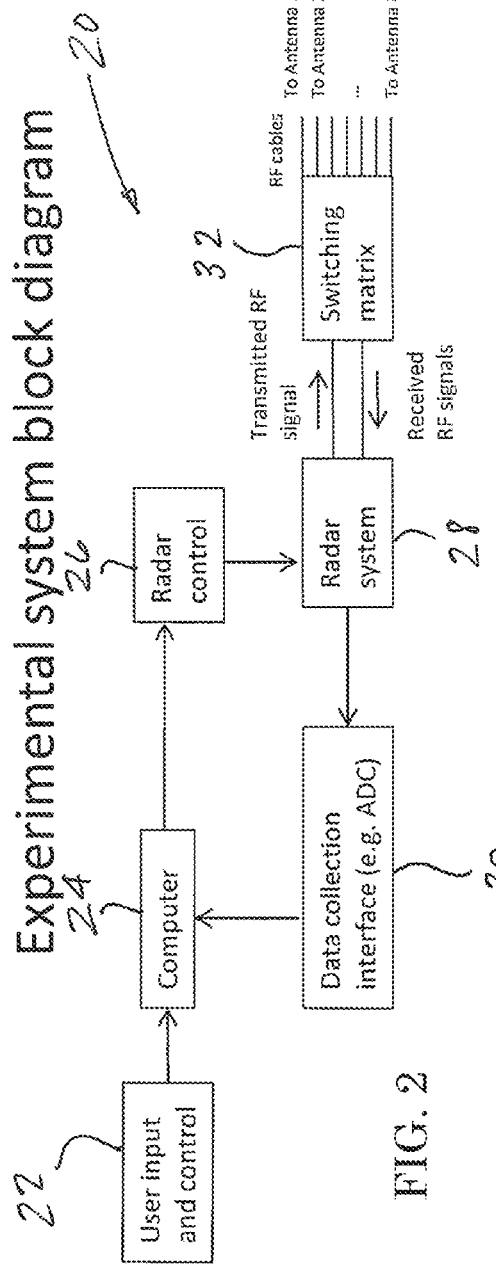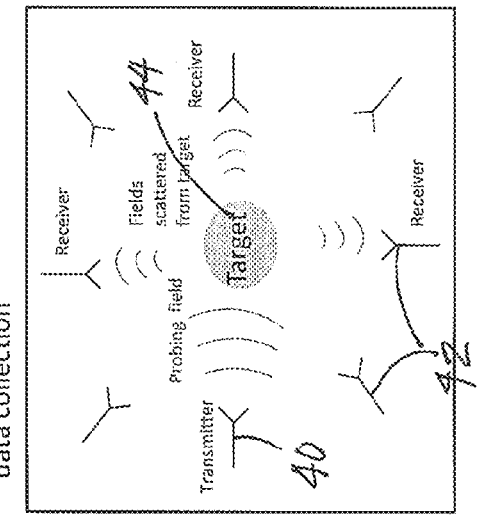

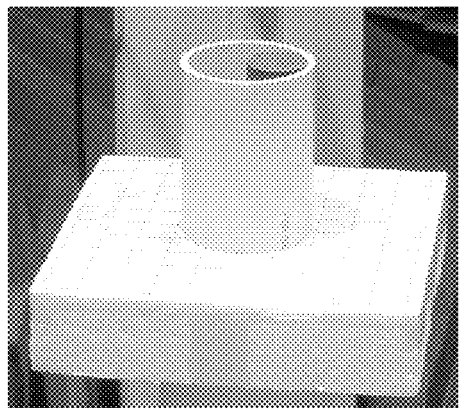 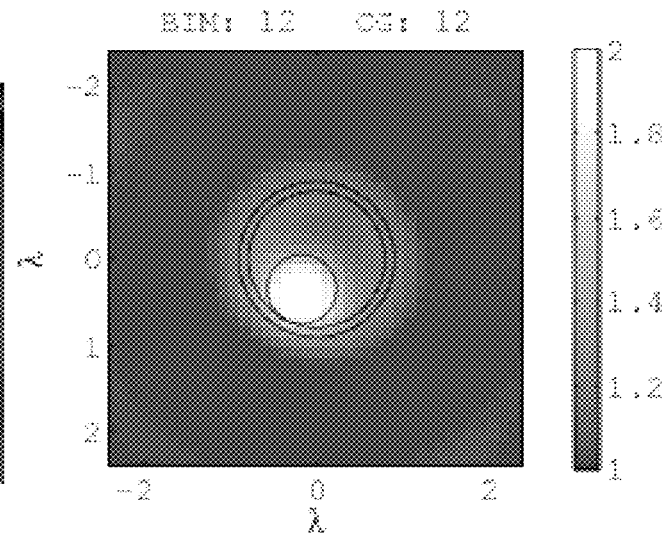
FIG. 38(a)    FIG. 38(b)
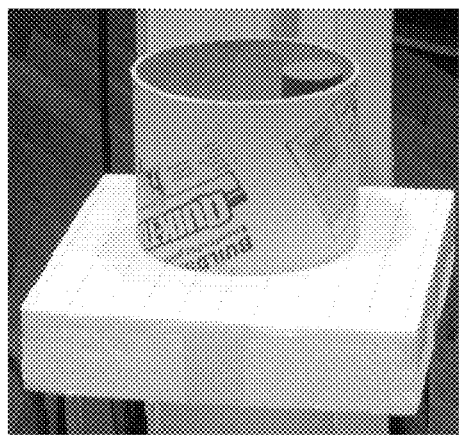 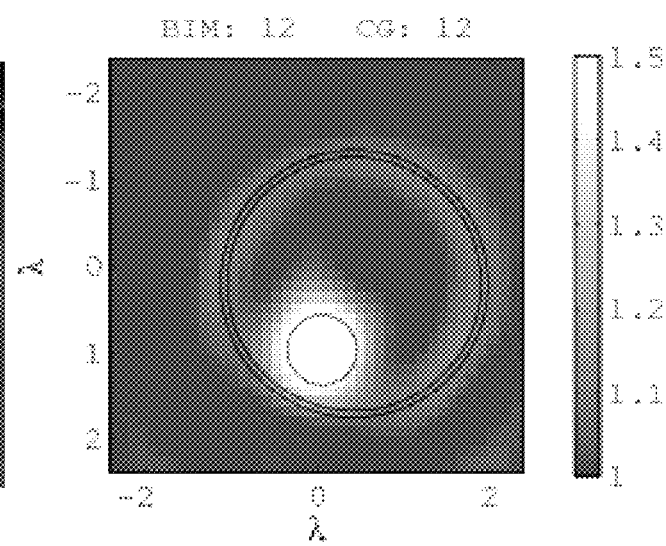
FIG. 38(c)    FIG. 38(d)

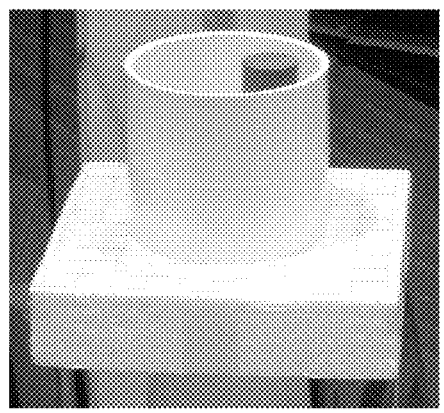
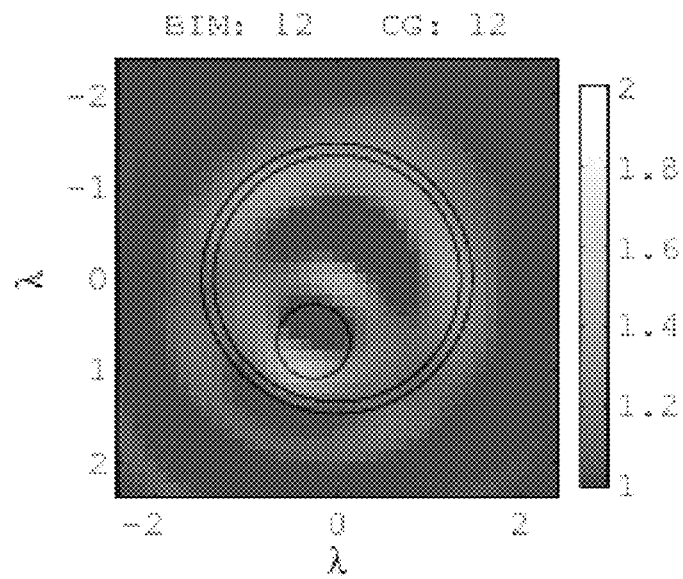
FIG. 40(a)          FIG. 40(b)
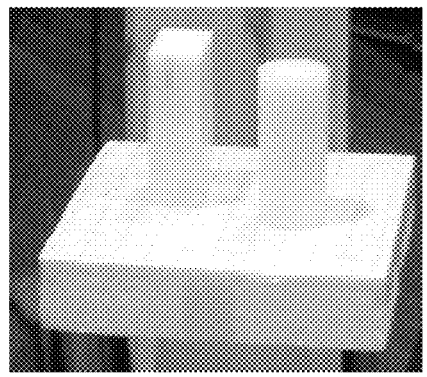
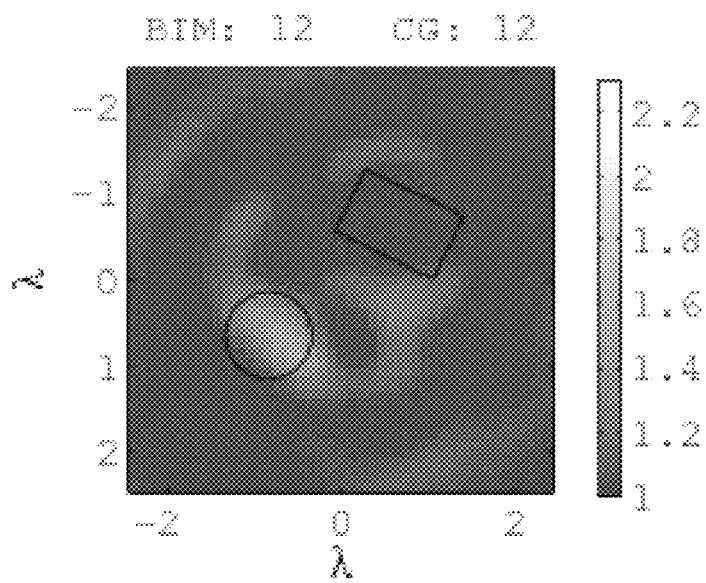
FIG. 41(a)          FIG. 41(b)

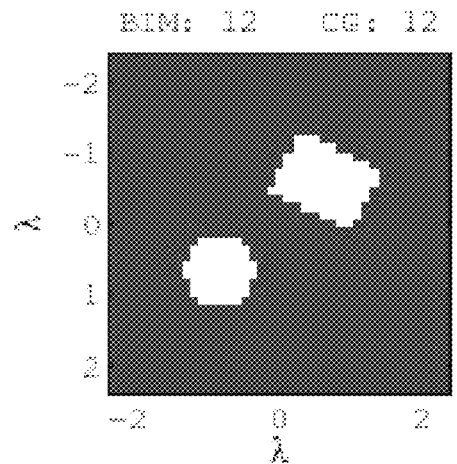
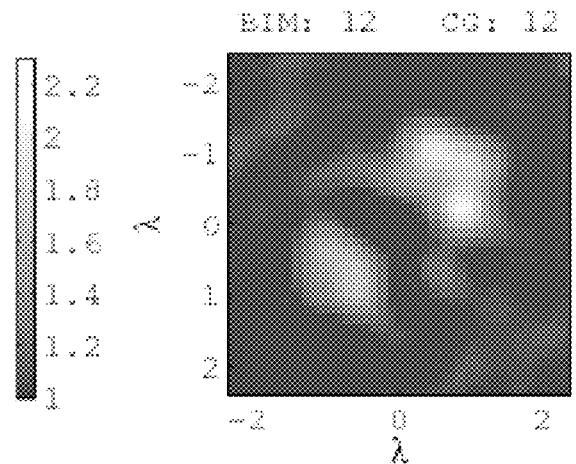
FIG. 42(a)                FIG. 42(b)
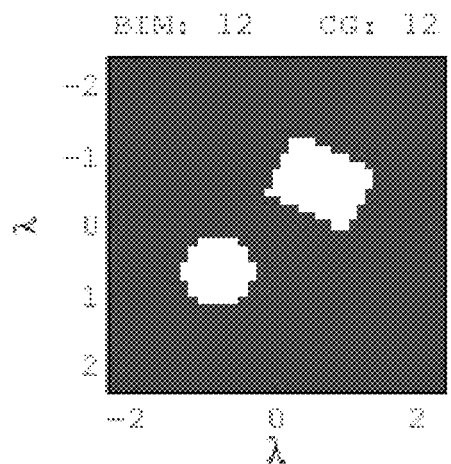
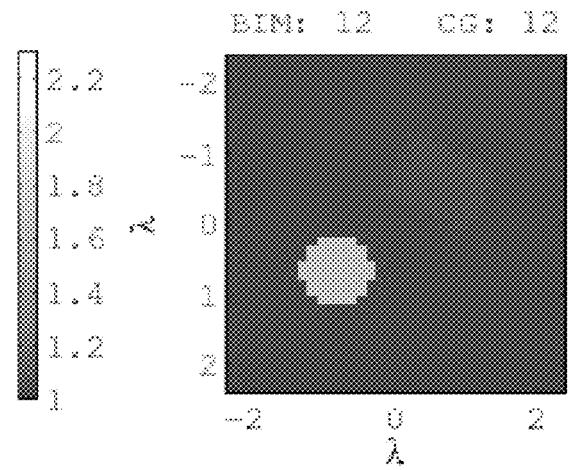
FIG. 43(a)                FIG. 43(b)

IMAGING SYSTEM AND METHOD

CROSS-REFERENCE TO RELATED APPLICATION

This application claims the benefit of U.S. Provisional Patent Application No. 61/488,865 filed May 23, 2011, the entire contents of which are hereby incorporated by reference.

STATEMENT REGARDING FEDERALLY SPONSORED RESEARCH

This invention was made with government support under CBET0756338 awarded by the National Science Foundation and W81XWH-08-1-0272 awarded by the Army Medical Research and Materiel Command. The government has certain rights in the invention.

TECHNICAL FIELD

The present invention generally relates to imaging systems and methods and, more particularly, to systems and methods that image or otherwise provide information regarding the electromagnetic and/or mechanical properties of the objects being evaluated.

BACKGROUND

Much work has been done in the field of soft tissue imaging, including some that is based on the assumption that benign and malignant tissues have different properties and, if imaged or quantified properly, could be of additional diagnostic benefit. Two techniques that have been used for soft tissue imaging include time-domain focusing, similar to traditional ultrasound beamforming, and inverse scattering, also called tomography.

SUMMARY

In accordance with one aspect of the invention, there is provided an imaging method that includes the steps of: (a) determining an incident field, (b) using the incident field and a volume integral equation (VIE) to determine a total field, (c) predicting voltage ratio measurement at a receiving antenna by using the volume integral equation (VIE), wherein the VIE includes a vector Green's function, (d) collecting voltage ratio measurements from one or more receiving antennas, and (e) comparing the predicted voltage ratio measurements to the collected voltage ratio measurements to determine one or more properties of the object being evaluated.

In accordance with another embodiment of the invention there is provided an imaging system that includes at least one transmitting antenna for transmitting probing field radiation towards a target object, at least one receiving antenna for receiving at least some of the radiation that is scattered by the target object, and a computer-based data collection system that operates to determine an incident field related to the transmitted radiation, determine a total field, compute a receiving antenna voltage ratio measurement using a volume integral equation (VIE) that includes a vector Green's function, receives actual voltage ratio measurements from the one or more receiving antennas, and determines at least one property of the target object using the computed voltage ratio measurement and the actual voltage ratio measurements.

BRIEF DESCRIPTION OF THE DRAWINGS

One or more preferred exemplary embodiments of the invention will hereinafter be described in conjunction with the appended drawings, wherein like designations denote like elements, and wherein:

FIG. 2 is a block diagram of a data collection system that may be used with transmitting and receiving antennas to carry out the method of FIG. 1;

FIGS. 3-5 depict different antenna setups for use with the method of FIG. 1 and the data collection system of FIG. 2;

FIGS. 38(a) and 38(c) show target object setups using an outer ring (tube) and eccentric inner cylinder, and FIGS. 38(b) and 38(d) show respective reconstructed relative permittivities after twelve BIM iterations;

FIG. 40(a) shows another test setup using a ring and eccentric cylinder and FIG. 40(b) shows a reconstructed relative permittivity after 12 BIM iterations;

FIG. 41(a) shows a rod and block test steup and FIG. 41(b) shows a reconstructed relative permittivity after 12 BIM iterations;

FIG. 42(a) shows objects used to generate synthetic scattered field data and FIG. 42(b) shows a reconstruction of the objects using synthetic data; and FIG. 43(a) shows an image reconstruction of a cylinder and block test object using synthetic data and FIG. 43(b) shows a reconstruction of the objects using experimental data.

DETAILED DESCRIPTION OF THE ILLUSTRATED EMBODIMENTS

Figure 1:
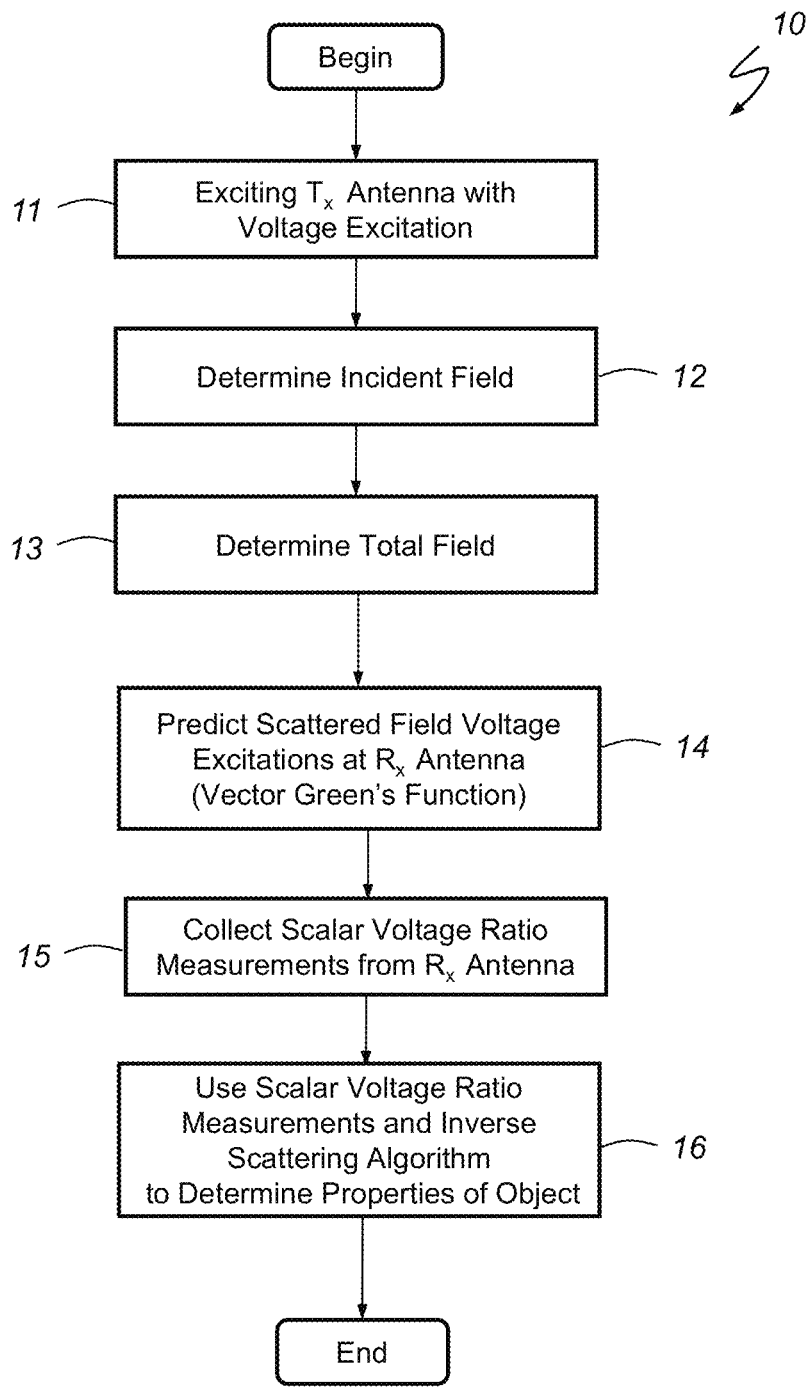
FIG. 1 is a flowchart depicting an embodiment of an imaging method in accordance with the invention.

With reference to FIG. 1, there is shown an exemplary method 10 that may be used to non-invasively produce an image of one or more properties of an object, such as the object's permittivity, susceptibility, conductivity, density, compressibility, acoustic loss, etc. Imaging method 10 may be used in a wide variety of non-invasive imaging applications, such as those in the medical field where soft tissue is evaluated, those in the logistical field where packages and other objects need to be inspected without being opened, and those in the scientific field where samples are analyzed for their constituent parts, just to name a few possibilities. In one exemplary application, method 10 helps screen and evaluate human or animal tissue for cancer (e.g., breast cancer, brain tumors, etc.) and may be used to supplement current screening techniques, as it provides the physician with yet another tool for discerning between benign and malignant tissue. These are, of course, only some of the potential applications and uses for imaging method 10, as the system and method disclosed herein are not limited to these examples and may be used with others.

Although imaging method 10 is described below in the context of electromagnetic waves, it should be appreciated that the method may be used with mechanical waves as well. In the electromagnetic wave embodiment, the imaging method may generate an image of one or more of the electromagnetic properties of the object being evaluated (e.g., the object's permittivity, susceptibility, conductivity and/or other dielectric properties); in the mechanical wave embodiment, the imaging method may generate an image of one or more of the mechanical properties of the object (e.g., the object's density, compressibility, acoustic loss, etc.). It should be appreciated that FIG. 1 is only meant to be a high-level illustration of the overall structure of an exemplary imaging method 10 and that each of the method steps may include any number of different sub-steps and techniques.

Generally speaking, imaging method 10 generally includes the steps of: exciting one or more transmitting antennas with a voltage excitation (ref), step 11; determining the incident field in the object domain due to the voltage excitation on the transmitting antennas, step 12; using the incident field and a volume integral equation (VIE) to determine a total field for the object being evaluated, step 13; predicting the scattered field voltage excitations at a receiving antenna by using the volume integral equation (VIE), which includes using a vector Green's function for a receiving antenna, step 14; collecting scalar voltage ratio measurements from one or more receiving antennas, step 15; and, using the scalar voltage ratio measurements and an inverse scattering algorithm to determine one or more properties of the object being evaluated 20, step 16. Depending on the particular embodiment, step 12 may determine the incident field in the object domain by one or more of the following techniques: i) using an antenna model to determine one or more expansion coefficients, and then using the expansion coefficients and a multipole expansion to determine the incident field; ii) measuring the incident field through experiment; and/or iii) estimating the incident field using simulation.

Introduction—

In order to investigate the scattering from inhomogeneous media, the solution to the electric field vector wave equation is often cast as a volume integral equation (VIE). An inhomogeneous object is represented by a material contrast relative to the background, and the kernel of the VIE is the background dyadic Green's function. The dyadic Green's function can be used either to determine the total field solution inside the object domain or to move the field quantities inside the object domain to observed fields outside the object domain. While this type of formulation may be indispensable for analytic and numerical studies, the vector fields predicted by the VIE in the latter case may not be observed directly in measurement. That is, actual measurements of fields are performed with antennas or probes, the outputs of which are voltage excitations, which are scalar quantities. Thus, in order to directly link the material contrasts of the VIE to scalar measurement quantities like voltages, method 10 uses a kernel which, instead of relating fields to fields, relates fields to scalars.

Some skilled artisans have noted that there is a lack of attention to full-wave antenna models in both theoretical and experimental scattering and inverse scattering. Forward and inverse algorithms based on the VIE commonly use infinitesimal dipole sources and full vector data when analyzing scattering phenomena or when forming images. While dipole sources, plane wave sources, or antenna gain patterns might be adequate for many systems, an additional modeling step, or antenna characterization, may still be required to properly link the fields collected by an antenna to its output voltage. Polarimetric remote sensing systems are often calibrated using the radar cross section of trihedral corner reflectors, which is appropriate for investigations of rough-surface scattering or other random media for which absolute phase measurements are not required or defined. Full-wave systems, however, such as those for inverse scattering, which: 1) use absolute phase, 2) deal with near-fields, or 3) illuminate objects and receive fields from large fields of view, may require more complete antenna models.

Even with the proper use of standard calibration targets for experimental scattering and inverse scattering, a method to directly link the VIE to measurement quantities for both near-field and far-field experiments using a full-wave antenna model has been missing. Furthermore, the measurement of choice in microwave engineering is often the set of S-parameters, or some other voltage ratio, due to the ease and accuracy of calibrating a vector network analyzer (VNA), as well as the familiarity and meaning of S-parameters. Thus, method 10 may not only link the VIE directly to measurement quantities, it also may be used to link it to S-parameter measurements.

The antenna model used in method 10 is based on the source-scattering matrix formulation. This model relates the multipole fields radiated and received by an antenna to the incoming and outgoing voltages on a feeding transmission line. When used in conjunction with the VIE, the antenna model can manifest itself as a new kernel which moves field quantities in the object domain to a scalar voltage on the transmission line. Because of the role this new kernel serves in the VIE, it is broadly referred to here as a "vector Green's function," and can be used to predict an object's scattered field S-parameters measured in a mono-static or bi-static antenna system.

To further distinguish the vector Green's function from the standard dyadic Green's function, it should be noted that the vector Green's function may be used only in a measurement role. Such a case may be analogous to when the observation point argument of the dyadic Green's function is evaluated at a receiver location. The vector Green's function, however, implicitly includes the antenna model. In most embodiments, the vector Green's function is not used to simulate the forward scattering of an object, nor is it to be confused with functions where it is one column of the dyadic Green's function or where it is defined by the gradient of the scalar green's function. According to an exemplary embodiment, method 10 calibrates the antenna output by converting voltages excitations to radiated fields and does so based on a variation of the electric field volume integral equation (VIE) for inhomogeneous media that is tailored for microwave S-parameter measurements. The kernel of the standard VIE is a dyadic Green's function which can relate fields in the object domain to observed scattered fields outside the object domain, while the kernel in method 10 is a vector Green's function which can relate fields in the object domain to S-parameter measurements outside the object domain. Thus, the exemplary kernel or formulation may directly link properties of the object being evaluated (e.g., permittivity, susceptibility, conductivity and/or other dielectric properties) to measurements being received, and it may do so in a way that is useful to many applications (e.g., microwave applications).

It can be shown using reciprocity that the dyadic Green's function is related to the incident field produced by an infinitesimal source. Analogously, the vector Green's function may be related to the incident field produced by an antenna and proper scaling factors may be found. Even though the primary derivation is for antennas and objects in free-space, it should be appreciated that the relationship between the vector Green's function and the antenna incident field holds whether or not there exist closed form expressions for either. This implies that simulation may be used to estimate the vector Green's function for any complex measurement geometry where it will include all background multiple scattering not included in the VIE object function.

It should be appreciated that the following derivation can also be applied to mechanical waves and sources, such as acoustic waves.

Exciting $T_x$ Antenna with Voltage Excitation—

Beginning with step 11 excites one or more transmitting antennas (e.g., an antenna array) with voltage excitations (ref), and may do so in any number of different ways. FIGS. 2-5 show several different exemplary systems and setups that may be used with step 11, including data collection system 20. According to this embodiment, data collection system 20 includes user input 22, computer 24, radar control 26, radar system 28, data interface 30, switch 32, and antenna array 34.

Generally speaking, computer 24 receives input from user input 22 so that the user can manipulate, adjust or otherwise control one or more system parameters. Computer 24 provides radar control 26 with instructions so that the radar control can operate the various antennas of antenna array 34 in some coordinated fashion. In the exemplary embodiments shown in FIGS. 3-5, antenna array 34 includes one transmitting antenna 40 and a number of receiving antennas 42 circumferentially surrounding a target or object being evaluated 44 (e.g., human tissue) so that electromagnetic waves can be reflected off of the target and evaluated. Transmitting antenna 40 and receiving antennas 42 are connected to switch 32, which may act like a multiplexor of sorts by individually receiving and transmitting the output from the various antennas. In one embodiment, switch 32 goes around the antenna array, sequentially accepting output from the different receiving antennas, and packages and sends the antenna output to radar system 28. Antenna array 34 may include one or more square patch antennas or any other suitable antenna type, and radar system 28 may include a two-port Vector Network Analyzer (VNA), as is understood by those skilled in the art. As best illustrated in FIG. 5, transmitting antenna 40 emits radar waves that impinge target 44 and reflect or scatter off of the target accordingly. Receiving antennas 42, which circumferentially surround target 44, gather the reflected radar waves and provide them back to radar system 28 so that an image can be formed of one or more electromagnetic properties of the target or object 44 that is being evaluated. Data interface 30 may be used to process or couple the raw data or information from radar system 28 to computer 24 (e.g., to convert the data from an analog format to a digital one). Thus, data collection system 20 functions as a multistatic radar system using the antenna array 34.

In the examples shown in FIGS. 3 and 5, the radar waves are transmitted through free space. That is, target 44 is simply placed on a pedestal or other support and is surrounding by the free space atmosphere at that location. The embodiment shown in FIG. 4, however, includes a chamber 50 that surrounds or encompasses target 44 so that the space within the chamber can be filled with a liquid medium 52 having a high dielectric constant and moderate loss (e.g., an oil-water emulsion). The liquid medium 52 should be coupled or matched to target 44, and may be selected to work with electromagnetic waves of a certain wavelength, etc. Other setups and arrangements are certainly possible, as step 11 is not limited to the exemplary system shown in FIG. 1 nor is it limited to radio waves or even electromagnetic waves, as mentioned above. Data collection system 20 could use a mono-static, bi-static or other multi-static antenna system in place of the exemplary system shown in the FIGS. 3-5, to cite a few possibilities.

Once the transmitting antenna(s) have been exciting with voltage excitations, the method determines the incident field $E_{inc}(r)$ in the object domain, step 12.

Determining the Incident Field—

Step 12 determines the incident field $E_{inc}(r)$ in the object domain due to the voltage excitation on the transmitting antennas, and may do so in a number of different ways. This step, in combination with some of the other steps of method 10, is sometimes referred to as "calibrating," and is described below with a number of derivations.

The electric field volume integral equation (VIE) for an inhomogeneous distribution of permittivity and conductivity is given by:

$$E(r) = E_{inc}(r) + k_o^2 \int \overline{G}(r, r') \cdot \left( \delta\epsilon(r') + \frac{i\delta\sigma(r')}{\epsilon_b w} \right) E(r') dV' \quad (1)$$

where $E(r)$ and $E_{inc}(r)$ are the total and incident fields, respectively, r is the observation position vector, the quantity $k_o^2 = w^2 \mu_o \epsilon_b$ is the lossless background wave number, and $\epsilon_b = \epsilon_o \epsilon_{rb}$ is the background permittivity with relative permittivity $\epsilon_{rb}$. The object contrast functions are defined as:

$$\epsilon_b \delta\epsilon(r) = \epsilon(r) - \epsilon_b \quad (2)$$

$$\delta\sigma(r) = \sigma(r) - \sigma_b \quad (3)$$

where $\sigma_b$ is the background conductivity, the quantity $\delta\epsilon(r)$ is unitless, $\delta\sigma(r)$ is an absolute measure of conductivity with units of Siemens per meter, $\overline{G}(r,r')$ is the dyadic Green's function for the background medium. In free space, this is given by $$\overline{G}(r, r') = \left[ \overline{I} + \frac{\nabla'\nabla'}{k^2} \right] g(r, r') \quad (4)$$

where, $$g(r, r') = \frac{e^{ikr}}{4\pi r} \quad (5)$$

with $r=|r-r'|$. The background wave number, k, is given by $$k^2 = k_o^2 \left( 1 + i\frac{\sigma_b}{\epsilon_b \omega} \right) \quad (6)$$

Defining the scattered field as $$E_{sca}(r) = E(r) - E_{inc}(r) \quad (7)$$

and taking the observation point r outside of the object domain or region in Eqn. (1), we can write the VIE for the scattered field as, $$E_{sca}(r) = \int \overline{G}(r,r') \cdot O(r') E(r') dV' \quad (8)$$

where we define the following object function as, $$O(r) = k_o^2 \left( \delta\epsilon(r) + i\frac{\delta\sigma(r)}{\epsilon_b \omega} \right) \quad (9)$$

Turning now to the multipole expansion and antenna model, let the total electric field in the frame of an antenna be expressed by the multipole expansion, $$E(r) = \sum_{lm} [a_{lm} M_{lm}(r) + b_{lm} N_{lm}(r) + c_{lm} \mathfrak{R} M_{lm}(r) + d_{lm} \mathfrak{R} N_{lm}(r)] \quad (10)$$

where r is the position vector, the quantities $M_{lm}(r)$ and $N_{lm}(r)$ are the free-space vector wave functions, and $\mathfrak{R}$ means the regular part of the corresponding spherical Bessel function. The conventions for vector wave functions are given by, $$M_{lm}(r) = \nabla \times [r z_l(kr) Y_{lm}(\theta, \phi)] \quad (11)$$

$$N_{lm}(r) = \frac{1}{k} \nabla \times M_{lm}(r) \quad (12)$$

where $z_l(kr)$ is any spherical Bessel function and $Y_{lm}(\theta,\phi)$ are the angular harmonics.

The quantities $a_{lm}$ and $b_{lm}$ are the expansion coefficients for outgoing waves, and $c_{lm}$ and $d_{lm}$ are the coefficients for incoming waves. The number of harmonics needed to represent a field produced by an antenna is O(kd), where d is the largest dimension of the antenna.

Figure 6:
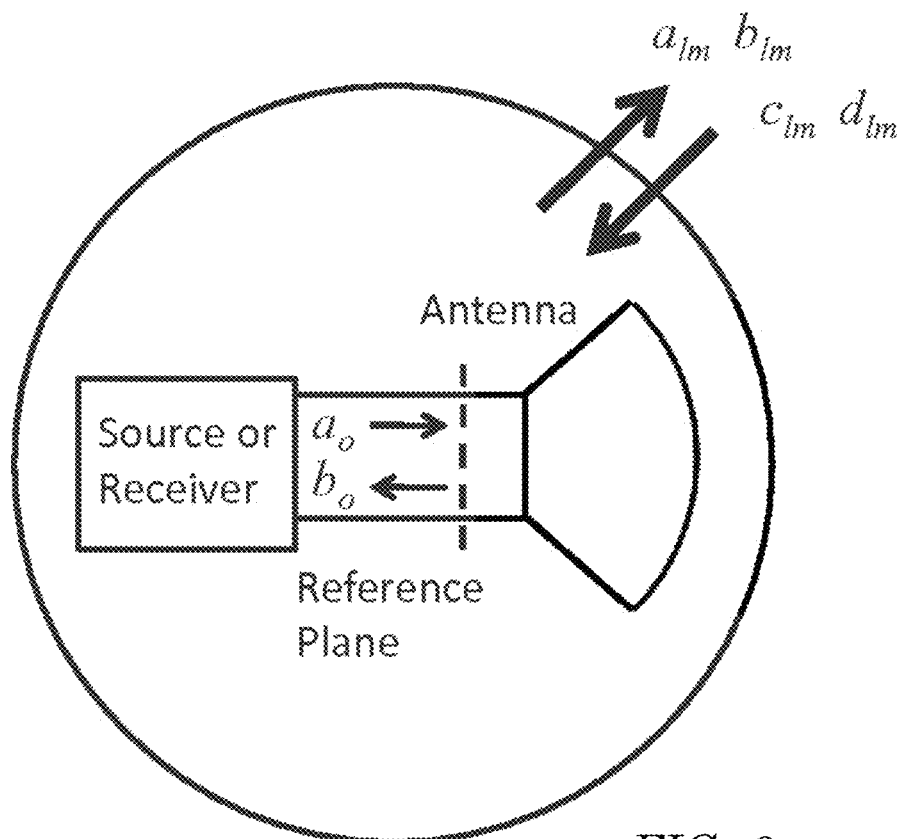
FIGS. 6 and 7 are diagrammatic views of antenna and transmission line setups.

The full antenna response is modeled following the source-scattering matrix formulation. The antenna is connected to a shielded transmission line, as shown in FIG. 6, where $a_o$ and $b_o$ are complex outgoing and incoming voltages, respectively, on the transmission line. The voltages on the transmission line are related to the multipole expansion coefficients through a linear antenna model that is written as, $$b_o = \sum_{lm} (u_{(c)lm} c_{lm} + u_{(d)lm} d_{lm}) \quad (13)$$

$$a_{lm} = a_o t_{(a)lm} \quad (14)$$

$$b_{lm} = a_o t_{(b)lm} \quad (15)$$

The quantities $u_{(c)lm}$ and $u_{(d)lm}$ are receive coefficients which convert incoming field harmonics to $b_o$. Similarly, $t_{(a)lm}$ and $t_{(b)lm}$ are transmit coefficients which convert $a_o$ to outgoing field harmonics. This model uses the following assumptions: 1) there is no multiple scattering between the antenna and other antennas or objects, and 2) the transmission line is matched looking into the source or receiver.

Assuming the antenna is reciprocal, the transmit and receive coefficients have the following reciprocity relations, $$u_{(c)lm} = \frac{Z_o}{2k\omega\mu}l(l+1)(-1)^m t_{(a)l,-m} \quad (16)$$

$$u_{(d)lm} = \frac{Z_o}{2k\omega\mu}l(l+1)(-1)^m t_{(b)l,-m} \quad (17)$$

where k is the wavenumber of the medium, ω is the operating frequency in radians, μ is the background permeability, and $Z_o$ is the characteristic impedance of the transmission line.

Given the assumptions above, the incident field produced by a transmitting antenna is composed of only outgoing waves. Using the antenna model, we can write the incident field in the frame of the transmitter as $$E_{inc}(r) = \sum_{lm}(a_{lm}M_{lm}(r) + b_{lm}N_{lm}(r)) \quad (18)$$

$$= a_o\sum_{lm}(t_{(a)lm}M_{lm}(r) + t_{(b)lm}N_{lm}(r)) \quad (19)$$

$$= a_o e_{inc}(r) \quad (20)$$

where $e_{inc}(r)$ is the normalized incident field. This is a field produced by only the transmit coefficients, and can be thought of as the excitation-independent multipole expansion. $E_{inc}$ has units of V/m and $a_o$ has units of V, so $e_{inc}$ has units of 1/m.

As mentioned above, instead of using the derivation outlined above, step 12 may alternatively measure the incident field through experimentation and/or estimate the incident field using simulation. Other methods and techniques for determining the incident field may be used as well. Once the incident field has been determined, the method determines the total field for the object being evaluated, step 13.

Determining the Total Field—

Step 13 uses the incident field and a volume integral equation (VIE) to determine a total field for the object being evaluated, and may do so in a number of different ways. Consider the total field, which is the solution of Eqn. (1) given the object contrasts and incident field. Even though the total field results from solving an integral equation, it is still only linearly proportional to the source excitation. Letting the solution of Eqn. (1) be represented by the operator inverse, and substituting Eqn. (20), we can write the total field as $$E(r) = (\bar{I} - \bar{G}O)^{-1}E_{inc}(r) \quad (21)$$

$$= a_o(\bar{I} - \bar{G}O)^{-1}e_{inc}(r) \quad (22)$$

$$= a_o e(r) \quad (23)$$

where we define e(r) as the normalized total field. This is the field solution resulting from a normalized incident field. That is, the field solution due to a source described by only the transmit coefficients. Similar to $e_{inc}(r)$, e(r) also has units of 1/m.

Once the total field has been determined, the method predicts the scattered field voltages at a receiving antenna, step 14.

Predict Scattered Field Voltages—

Step 14 predicts the scattered field voltages at a receiving antenna by using the volume integral equation (VIE), which includes using a vector Green's function. The dyadic Green's function, which is the kernel of a traditional VIE, serves to move field quantities inside the object region to field quantities outside the object region. In practice, though, it can be difficult to measure fields directly; instead, we measure a voltage response at the terminals of an antenna, which are scalar quantities. Step 14 uses an additional modeling step to convert the fields at observation points to voltages, and the antenna model described previously is one mechanism to do this. When the antenna model is used in conjunction with the VIE, it may manifest itself concisely as a new kernel, which, instead of transforming fields to fields, transforms fields to scalars. That is, the new kernel of step 14 can move field quantities inside the object region directly to scalar measurement quantities outside the object region. This kernel is a vector as opposed to a dyad; thus, it is referred to here as the vector Green's function. Because the antenna model links the fields of an antenna to the voltages on its feeding transmission line, using the concept of normalized fields, the vector Green's function is specialized for S-parameter measurements.

In order to use the antenna model, the scattered field from the VIE is expanded as incoming waves in the reference frame of the receiver. Beginning with the addition theorem for the free-space dyadic Green's function, $$\bar{G}(r, r') = ik\sum_{lm}\frac{1}{l(l+1)}[\Re M_{lm}(r)\hat{M}_{lm}(r') + \Re N_{lm}(r)\hat{N}_{lm}(r')] \quad (24)$$

where hat, ^, denotes conjugating the angular part of the vector wave function. The dyad is formed by taking the outer product of $\Re M_{lm}(r)$ and $\hat{M}_{lm}(r')$, and of $\Re N_{lm}(r)$ and $\hat{N}_{lm}(r')$. Here, r and r' are position vectors in the frame of the receiver where |r|<|r'|. Substituting Eqn. (24) into the VIE, Eqn. (8), we have, $$E_{sca}(r) = \int\left(ik\sum_{lm}\frac{1}{l(l+1)}[\Re M_{lm}(r)\hat{M}_{lm}(r') + \Re N_{lm}(r)\hat{N}_{lm}(r')]\right)\cdot O(r')E(r')dV' \quad (25)$$

Exchanging the order of integration and summation, and collecting the terms being integrated, the scattered field of the VIE can be written as incoming fields in the frame of the receiver as, $$E_{sca}(r) = \sum_{lm}(c_{lm}\Re M_{lm}(r) + d_{lm}\Re N_{lm}(r)) \quad (26)$$

where the expansion coefficients are $$c_{lm} = \frac{ik}{l(l+1)}\int\hat{M}_{lm}(r')\cdot O(r')E(r')dV' \quad (27)$$

$$d_{lm} = \frac{ik}{l(l+1)}\int\hat{N}_{lm}(r')\cdot O(r')E(r')dV' \quad (28)$$

The quantity O(r)E(r) can be thought of as a collection of infinitesimal dipole current sources. The vector wave functions in the integrands of Eqns. (27) and (28) effectively translate the fields radiated from these dipoles so as to be expanded as incoming waves in the frame of the receiver. This action can be compared to the translation of dipole fields in the context of T-matrix methods. The multipole expansion of an infinitesimal dipole has at most three harmonics: (l,m)= (1,−1), (1,0), (1,1). Thus, translating dipole fields using the translation matrices for vector spherical harmonics only requires the first three columns of the matrices. The matrix entries have Hankel functions for the radial part, and the vector argument points from the dipole to the receiver. The wave functions in the integrands of Eqns. (27) and (28) act as these columns. While these also have Hankel radial parts, the vector argument points from the receiver to the dipole, hence the angular conjugate. Thus, we see that the incoming field coefficients are the aggregates of all translated dipole fields.

Figure 7:
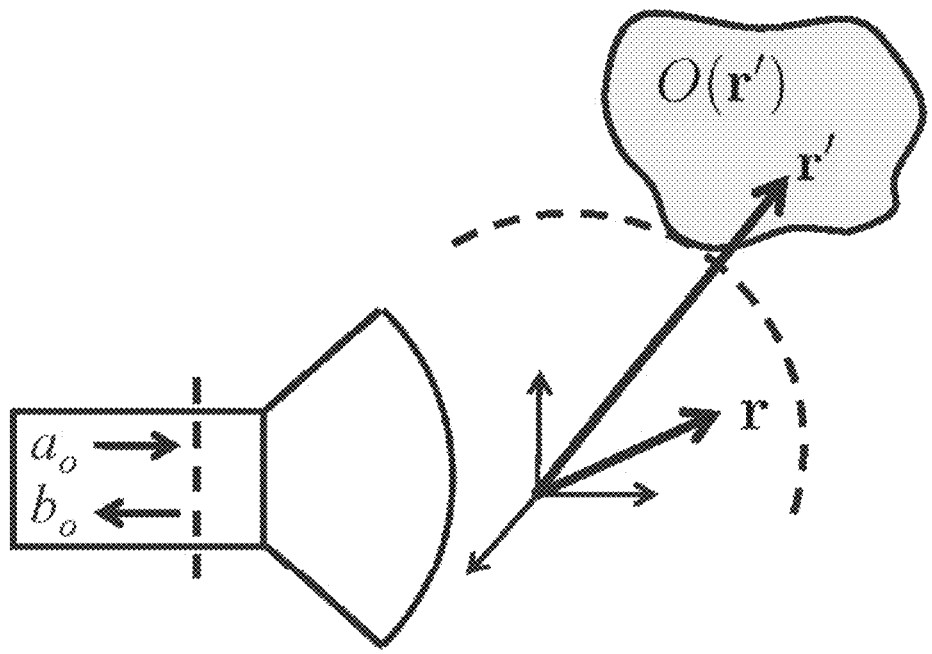

The condition |r|<|r'| can now be interpreted more carefully. The observation points r are restricted to a sphere with a radius less than the radius of the nearest point of integration in Eqns. (27) and (28), which is the nearest point of non-zero contrast. In other words, the radius for the field expansion of the receiver should not overlap the object, as shown in FIG. 7, which shows an antenna and transmission line setup where the quantities $a_0$ and $b_0$ are outgoing and incoming voltage on the transmission line, respectively. The dotted line represents the nearest point of nonzero contrast and the maximum radius for the antenna multipole expansion.

We also point out that the right hand vector of each term of the dyadic outer product serves to translate the scattered fields, while the left hand vector serves to expand the scattered field as incoming waves in the frame of the receiving antenna.

Now that we have the expansion coefficients for the scattered field in the frame of the receiver, we substitute Eqns. (27) and (28) into the antenna model, Eqn. (13), giving $$b_o = \sum_{lm} \left[ u_{(c)lm} \frac{ik}{l(l+1)} \int \hat{M}_{lm}(r') \cdot O(r')E(r')dV' + u_{(d)lm} \frac{ik}{l(l+1)} \int \hat{N}_{lm}(r') \cdot O(r')E(r')dV' \right] \quad (29)$$

Exchanging the order of integration and summation again and factoring out the object and total field produces, $$b_o = \int \sum_{lm} \frac{ik}{l(l+1)} (u_{(c)lm}\hat{M}_{lm}(r') + u_{(d)lm}\hat{N}_{lm}(r')) \cdot O(r')E(r')dV' \quad (30)$$

The term multiplying the object and total field acts as a Green's function. It is a vector which moves the vector quantity O(r)E(r) to a scalar, $b_o$. Letting the vector Green's function be g(r), we can write the incoming voltage on the transmission line due to the scattered field as:

$$b_o = \int g(r') \cdot O(r')E(r')dV' \quad (31)$$

where $$g(r') = ik \sum_{lm} \frac{1}{l(l+1)} (u_{(c)lm}\hat{M}_{lm}(r') + u_{(d)lm}\hat{N}_{lm}(r')) \quad (32)$$

The vector Green's function for the free-space VIE is a sum of dipole translations weighted by the receive coefficients of the antenna. It directly links field quantities in the object domain to the incoming voltage on the receiver transmission line.

Figure 8:
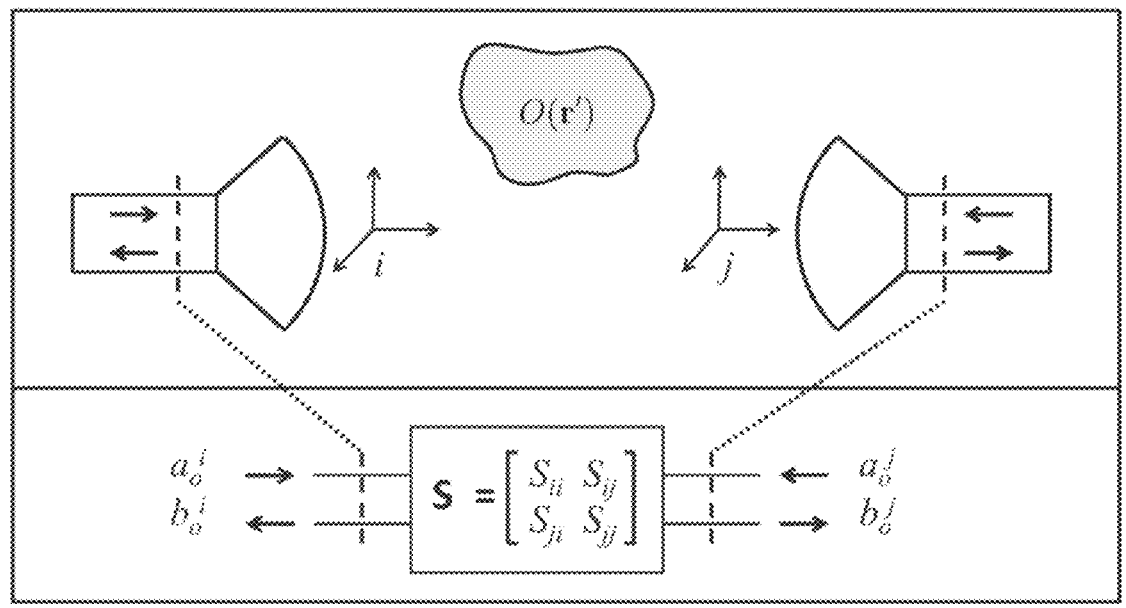
FIG. 8 shows a network model of two antennas and a scattering object.

Next, consider a bi-static system with two antennas, one transmitting in reference frame i, the other receiving in reference frame j, shown in FIG. 8, and subject to the assumptions previously described. Let the receiver vector Green's function be labeled $g_j(r)$ and let the total field in the object be $E_i(r)$, which is the unnormalized total field due to the transmitter. Equation (31) then becomes $$b_o^j = \int g_j(r') \cdot O(r')E_i(r')dV' \quad (33)$$

Finally, dividing both sides by the outgoing voltage on the transmission line of the transmitter, $a_o^i$, with the conditions before (matched receiver), the following S-parameter can be identified, $S_{ji} = b_o^j/a_o^i$, $$S_{ji} = \int g_j(r') \cdot O(r')e_i(r')dV' \quad (34)$$

where $e_i(r')$ is the normalized total object field produced by the transmitter.

Thus, the traditional scattered field volume integral equation has been transformed into one suitable for S-parameter measurements. The notation, $S_{ji}$, can be read similarly to its use for multi-port networks, where this is the scattered field S-parameter measured by a receiver in frame j due to a transmitter in frame i.

While Eqn. (34) has been derived in a bi-static $S_{21}$ measurement setup, it also applies to monostatic $S_{11}$ measurements. The S-parameters are measured between the reference planes on the antenna transmission lines, so that the antennas and the object scattering are represented by a 2-port microwave network, shown in FIG. 8, which is a network model of two antennas and a scattering object where S-parameters are measured between the reference planes on the antenna transmission lines.

To summarize, an expression in terms of S-parameters is arrived at because we used an antenna model relating transmission line voltages to multipole fields, as well as the concept of normalized fields.

As stated in the introduction, the vector Green's function is only used in a measurement role; it is not used to simulate the forward scattering of an object. In order to determine the total field or normalized total field in the object domain, one must solve Eqn. (1) or Eqn. (21) in its entirety using one of numerous techniques, e.g. Conjugate Gradient FFT, Neumann Series, Finite Difference Time Domain, etc. The forward solvers also require knowledge of the incident field throughout the object domain. In the context of this model, the normalized incident field is computed using Eqn. (20). Lastly, in experiment, it is difficult to measure the scattered field directly, but it can be obtained by subtracting the S-parameters for the total and incident fields, $$S_{ji,sca} = S_{ji,tot} - S_{ji,inc} \quad (35)$$

where $S_{ji,inc}$ is measured in the absence of the object, and $S_{ji,tot}$ is measured in the presence of the object.

The following description pertains to a reciprocity relation. Making use of the antenna coefficient reciprocity relations, Eqns. (16) and (17), g(r) can be written in terms of the transmit coefficients as $$g(r) = \frac{iZ_0}{2\omega\mu} \sum_{lm} (-1)^m \cdot (t_{(a)l,-m}\hat{M}_{lm}(r) + t_{(b)l,-m}\hat{N}_{lm}(r)) \quad (36)$$

$$= \frac{iZ_0}{2\omega\mu} \sum_{lm} (-1)^m \cdot (t_{(a)lm}\hat{M}_{l,-m}(r) + t_{(b)lm}\hat{N}_{l,-m}(r)) \quad (37)$$

The second relation comes from taking m→−m where the sum commutes and $(-1)^m$ is unaffected. This can be simplified further. $\hat{M}_{lm}(r)$ is the same as $M_{lm}(r)$ with the angular harmonics conjugated.

$$\hat{M}_{lm}(r) = \nabla \times [rz_l(kr)Y_{lm}^*(\theta,\phi)] \quad (38)$$

Using the identity $Y_{lm}^* = (-1)^m Y_{l,-m}$, we can show $$\hat{M}_{l,-m}(r) = (-1)^m M_{lm}(r) \tag{39}$$

The same relation is true for $N_{lm}(r)$. Using this in Eqn. (37), the vector Green's function becomes $$g(r) = \frac{iZ_0}{2\omega\mu} \sum_{lm} (t_{(a)lm} M_{lm}(r) + t_{(b)lm} N_{lm}(r)) \tag{40}$$

which is the expansion for the normalized incident field multiplied by a scaling factor $$g(r) = \frac{iZ_0}{2\omega\mu} e_{inc}(r) \tag{41}$$

or $$g(r) = \frac{Z_o}{2a_o} \frac{1}{i\omega\mu} E_{inc}(r) \tag{42}$$

The vector Green's function used in the VIE for a receiver can be interpreted as the incident field produced by that antenna in transmit mode and scaled by factors characterizing the transmission line. This form of the vector Green's function means the step of determining the antenna transmit and receive coefficients can be bypassed, if we can obtain and store the incident field with other means, such as simulation.

It should be recalled that the transmit and receive coefficients are related formally through reciprocity, so Eqn. (41) is a statement of reciprocity for this type of problem. This equation is another way of expressing the idea that an antenna receives the same way it transmits.

Substituting Eqn. (41) into Eqn. (34) the VIE can be written in terms of the normalized incident and total fields as $$S_{ji} = \frac{iZ_0^j}{2\omega\mu} \int e_{inc,j}(r') \cdot O(r') e_i(r') dV' \tag{43}$$

where $Z_o^j$ is the characteristic impedance of the receiver transmission line. Note that $e_{inc,j}(r')$ and $e_i(r')$ are fields transmitted by the receiver and transmitter, respectively.

The following description pertains to object-centered vector Green's function. Previously, the vector Green's function was derived for a receiver-centered scattering situation. In principle, given the condition $|r|<|r'|$, the object can surround the receiver. In practice, however, multiple antennas usually surround the object. Thus, the antenna model and derivation can be reworked for an object-centered situation, where we will be dealing with the condition $|r'|<|r|$.

Figure 9:
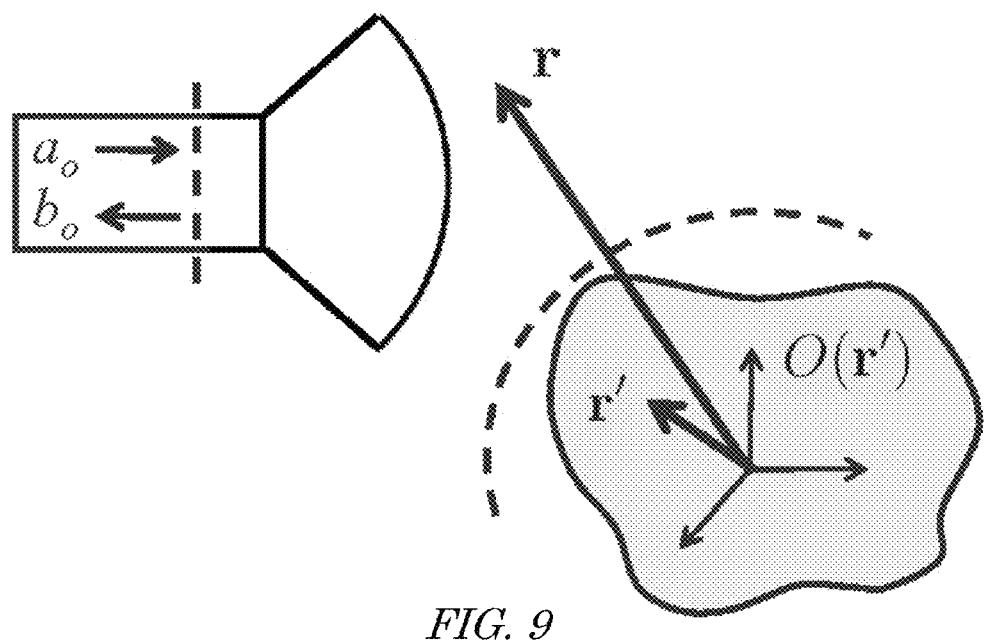
FIG. 9 shows an antenna and transmission line setup for an object-centered scattering scenario.

We begin by considering the setup in FIG. 9, which shows an antenna and transmission line setup for an object-centered scattering scenario. The quantities $a_0$ and $b_0$ are outgoing and incoming voltages on the transmission line, respectively. The dotted line represents the furthest point of non-zero contrast. The multipole expansion of the electric field is the same as before, Eqn. (10), but now it is expanded in the frame of the object instead of the antenna. The antenna model is, $$b_o = \sum_{lm} (u_{a(lm)} a_{lm} + u_{(b)lm} b_{lm}) \tag{44}$$

-continued $$c_{lm} = a_o t_{(c)lm} \tag{45}$$

$$d_{lm} = a_o t_{(d)lm} \tag{46}$$

The quantities $u_{(a)lm}$ and $u_{(b)lm}$ are the receive coefficients which convert outgoing field harmonics in the frame of the object to $b_o$. Similarly, $c_{lm}$ and $d_{lm}$ are transmit coefficients which convert $a_o$ to incoming field harmonics in the frame of the object. The derivation of the reciprocity relations between the antenna transmit and receive coefficients is nearly identical to that used to derive Eqns. (16) and (17), and the following analogous relations can be shown:

$$u_{(a)lm} = \frac{Z_o}{2k\omega\mu} l(l+1)(-1)^m t_{(c)l,-m} \tag{47}$$

$$u_{(b)lm} = \frac{Z_o}{2k\omega\mu} l(l+1)(-1)^m t_{(d)l,-m} \tag{48}$$

Next, we consider the dyadic Green's function under the condition $|r'|<|r|$, which is $$\bar{G}(r,r') = ik \sum_{lm} \frac{1}{l(l+1)} \left[ M_{lm}(r) \Re \hat{M}_{lm}(r') + N_{lm} \Re \hat{N}_{lm}(r') \right] \tag{49}$$

Substituting this into the VIE provides the scattered field in terms of outgoing coefficients in the frame of the object $$E_{sca}(r) = \sum_{lm} [a_{lm} M_{lm}(r) + b_{lm} N_{lm}(r)] \tag{50}$$

where $$a_{lm} = \frac{ik}{l(l+1)} \int \Re \hat{M}_{lm}(r') \cdot O(r') E(r') dV' \tag{51}$$

$$b_{lm} = \frac{ik}{l(l+1)} \int \Re \hat{N}_{lm}(r') \cdot O(r') E(r') dV' \tag{52}$$

The integration vector $r'$ now points from the origin of the object frame to an integration point still in the object domain. The vector wave functions in the integrands are translating the dipole fields to the origin of the object frame. $a_{lm}$ and $b_{lm}$ are the coefficients for the multipole expansion of the scattered field radiating from the object. This also means that the antennas cannot be inside a sphere with a radius smaller than the furthest point of non-zero contrast from the origin of the object frame, as shown in FIG. 9. Substituting these into the new antenna model produces, $$b_o = \int g(r') \cdot O(r') E(r') dV' \tag{53}$$

but this time $$g(r') = ik \sum_{lm} \frac{1}{l(l+1)} (u_{(a)lm} \Re \hat{M}_{lm}(r') + u_{(b)lm} \Re \hat{N}_{lm}(r')) \tag{54}$$

Some of the previously described steps can be used to find the scattered field S-parameter that would be measured between a transmitter and receiver. The incident field from the antenna is now expanded as incoming waves in the frame of the object and, following some of the steps previously described, the same relation between the vector Green's function and the incident field can be arrived at, Eqn. (41).

The following description pertains to a comparison with the Dyadic Green's function. The result of Eqn. (42) is compared to the method of determining the dyadic Green's function using the fields of infinitesimal dipoles. The incident field due to an arbitrary current distribution is given by $$E_{inc}(r) = i\omega\mu \int \overline{G}(r,r') \cdot J(r') dV' \quad (55)$$

Let the current source be an infinitesimal dipole at location $r_p$ with strength I and direction $\hat{p}$, $$J(r') = I\hat{p}\delta(r'-r_p) \quad (56)$$

Substituting this into the integral produces, $$E_{inc}(r, r_p) = i\omega\mu I \overline{G}(r, r_p) \cdot \hat{p} \quad (57)$$

or $$\overline{G}(r, r_p) \cdot \hat{p} = \frac{1}{i\omega\mu I} E_{inc}(r, r_p) \quad (58)$$

The columns of the dyadic green's function can be found by finding the incident field due to three orthogonal dipoles in turn. Using the reciprocity of the dyadic Green's function, the arguments r and $r_p$ can be swapped, which will provide the dyadic Green's function used in the VIE to predict observed scattered fields at the point $r_p$ by integrating over the points r. In principle, this technique can be used for any problem geometry, not only free-space, and has been used in simulation for nonlinear inverse scattering algorithms.

Comparing the multiplying constant in Eqn. (58) to that found for the vector Green's function in Eqn. (42) shows they differ by a factor of $-Z_o/2$ with $a_o$ in place of I. The line voltage, $a_o$, which normalizes the incident field for the vector Green's function is analogous to the strength of the dipole source, I, which normalizes the incident field for the dyadic Green's function. Thus, collapsing the dyad to a vector using the antenna model results in a constant which only depends on the feeding transmission line and antenna reciprocity.

From the above treatment of the dyadic Green's function, it might have been expected that the vector Green's function will be related to the incident field, but it took the use of a full antenna model to elucidate the proper multiplying constant in Eqn. (42).

The following description pertains to obtaining g(r). Determining the antenna transmit and receive coefficients can be difficult. These are the same transmit and receive coefficients that can be obtained from near-field antenna measurements. Near-field systems are expensive ventures, which require precise positioning and probe calibration. Alternatively, these coefficients can be estimated using simulation, from which g (r) can be computed using Eqn. (32) or Eqn. (40). However, from Eqn. (41), it is sufficient to simply know the incident field, which can be determined through measurement or estimated with simulation.

To see how to normalize excitation-dependent fields from a simulator, the normalized fields from Eqns. (20) and (23) are substituted into Eqn. (43)

$$S_{ji} = \frac{i}{2\omega\mu} \frac{Z_o^j}{a_o^j a_o^i} \int E_{inc,j}(r') \cdot O(r') E_i(r') dV' \quad (59)$$

Assuming that the average transmit power on the transmission line is, $P_{ave}$, and the characteristic impedance then from transmission line analysis the magnitude of $a_o$ is given by, $$|a_o| = \sqrt{2Z_o P_{ave}} \quad (60)$$

The phase of $a_o$ is found by comparing the transmission line reference plane used to determine the simulated fields to those used in measurement by, for instance, a vector network analyzer (VNA). In practice, it may be difficult to determine this phase, so it is best to try to make these reference planes the same, in which case, the phase of $a_o$ will be zero.

Although the vector Green's function was derived in a free-space scattering scenario, from the results of Eqns. (41) and (42), it is seen that the vector Green's function 1) only depends on the antenna incident field and transmission line, and 2) appears to be independent of the basis functions used for the field expansion. This implies that the previous derivation can be generalized to any geometry under certain assumptions.

In general, the addition theorem for the dyadic Green's function for a source free region can be written, $$\overline{G}(r, r') = \sum_\mu [k' M_\mu(r) M_\mu^*(r') + k'' N_\mu(r) N_\mu^*(r')] \quad (61)$$

where $M_\mu(r)$ and $N_\mu(r)$ are the electric and magnetic (or vice versa) solenoid vector wave functions, with adjoints (or inverses) M*(r) and N*(r) and k' and k'' are their normalizations. There will be conditions on the position vectors r and r' specific to the prescribed coordinate system, just as there are for the free-space dyadic Green's function. For example, there exist the analytic solutions of the dyadic Green's function for a z-oriented PEC cylinder, where there are conditions on z and z'.

Assuming that an addition theorem of the form in Eqn. (61) exists for a particular geometry, and assuming that the antenna fields can be expanded in the vector wave functions that make up the addition theorem, then a derivation can be carried out that is identical one previously described, regardless of the form of $M_\mu(r)$ and $N_\mu(r)$. If the antennas and scattering are reciprocal, the same reciprocity relation should be arrived at between the vector Green's function and the incident field, Eqn. (41). The term $-Z_o/2a_o$ will remain because it depends only on the feeding transmission line and electromagnetic reciprocity. The term $1/(i\omega\mu)$ remains as well because it comes from the source term in Maxwell's equations. One example of this generalization has already been provided by reworking the derivation of the vector Green's function in the previous section for the object-centered scattering situation.

The implications of this generalization are that Eqns. (41) and (42) will hold whether or not closed-form expressions can be found for the vector wave functions. Only the incident field needs to be obtained, which we can measure experimentally after proper probe calibration, or estimate with simulation.

Collect Scalar Voltage Ratio Measurements and Use them and an Inverse Scattering Algorithm to Determine One or More Properties of the Object being Evaluated—

Step 15 collects scalar voltage ratio measurements from one or more receiving antennas, and step 16 uses the scalar voltage ratio measurements and an inverse scattering algorithm, which may include a number of the previous steps, to determine one or more properties of the object being evaluated. Steps 15 and 16 may be performed in a number of different ways.

Several experiments were performed to validate the use of the vector Green's function with the VIE. First, a demonstration is performed that predicts the $S_{21}$ scattered field S-parameters from known objects using the VIE and vector Green's function in a free-space scenario. Next, a demonstration is performed that predicts the $S_{11}$ scattered field of objects close to an antenna. Third, a simulation is performed that predicts 2-port scattered field S-parameters in a near-field scenario for which we can only compute and store the incident and total fields, but otherwise have no knowledge of the types of basis functions that could satisfy the wave equation. Fourth, an experiment is performed that compares simulated, predicted, and measured 2-port scattered field S-parameters for a cavity-like experiment. The last two examples support the generalization described previously.

According to a first exemplary experiment, measured and predicted scattered field $S_{21}$ is determined in free space for a pair of dielectric spheres.

Figure 10:
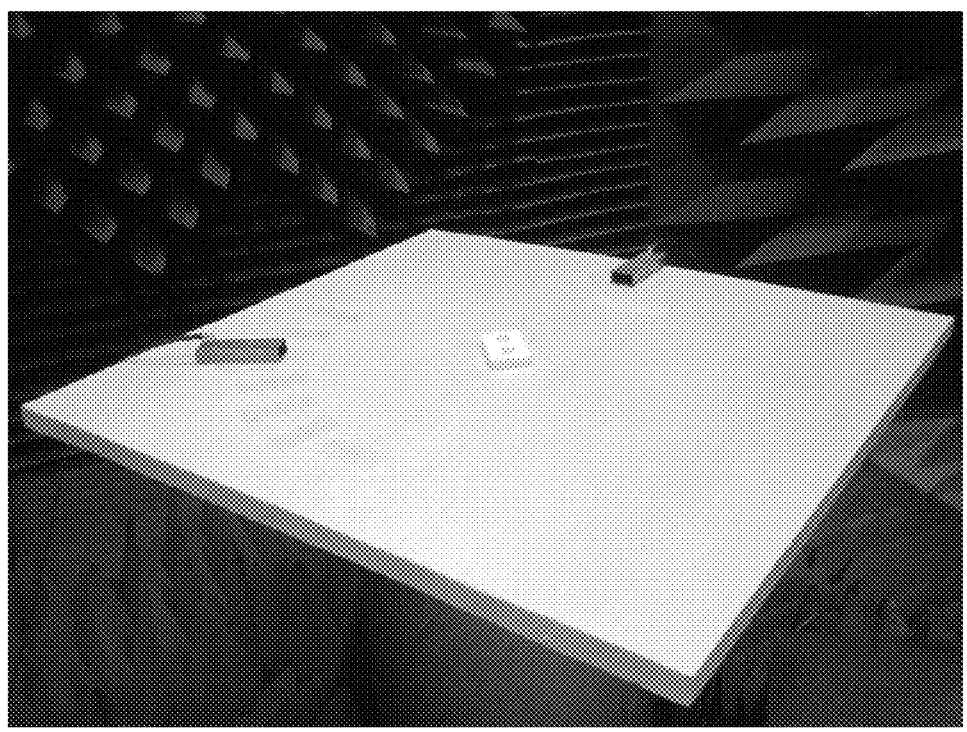
FIG. 10 shows an example setup using a transmitting and receiving waveguides and a target object comprising a pair of acrylic spheres.

Two identical waveguides are used as the transmitter and receiver. The waveguides and spheres are shown in FIG. 10. The waveguides are hollow brass having WR-187 specification operating between 4-6 GHz with outer dimensions of 2.54 cm×5.08 cm×15.2 cm, and fed with SMA extended dielectric flange mount connectors. The waveguides are characterized using Ansoft HFSS and a multipole and S-parameter method that uses HFSS to simulate the fields radiated by the antenna, which are used to estimate the antenna transmit coefficients. The average power on the transmission line is 1 Watt, so line voltage is given by $a_o=\sqrt{2Z_o}$. The transmit coefficients can then be used in Eqn. (20) to compute the normalized incident field at any points around the antenna except those in the very near-field.

The setup for this example is shown in FIG. 10, where two waveguides are rotated 120 degrees around the target at distances of 16 inches apart. The waveguides are placed on a Styrofoam board which is suspended on a Styrofoam pedestal in an anechoic chamber. Measurements were taken between 4-6 GHz. The transmitter and receiver are positioned 40.6 cm away from the scatterers. The transmitter is fixed and the receiver is positioned in 15 degree increments about the center from 90 to 180 degrees relative to the transmitter. The spheres are acrylic and identical, having a diameter of 2.54 cm and a relative permittivity of 2.5 and assumed lossless. The spheres are held in a Styrofoam support and separated by approximately 5 cm.

Figure 11:
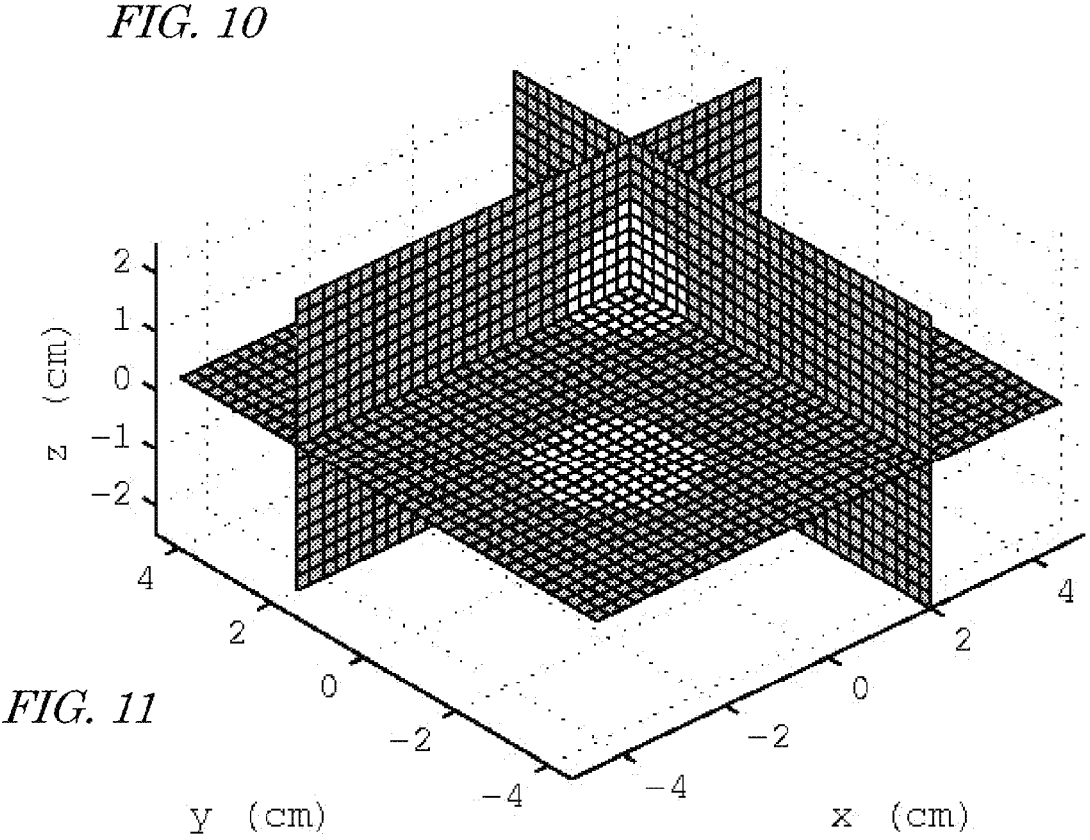
FIG. 11 depicts the discretized object domain for the example setup of FIG. 10.

$S_{21}$ is predicted using Eqn. (43) at 21 discrete frequencies between 4-6 GHz. First, an object domain is defined encompassing the two spheres with dimensions 9 cm×9 cm×5 cm. The object domain is discretized with a regular spacing of 2.5 mm, which is $\sim\lambda/20$ at 6 GHz in a material with relative permittivity of 2.5. The discretized domain and the dielectric contrast of the pair of spheres are shown in FIG. 11, which illustrates the discretized object domain for this example. Then using the transmit coefficients and Eqn. (20), the normalized incident field of the transmitter is computed at all points in the object domain. This is used to compute the normalized total field in the object region using the Bi-Conjugate Gradient FFT (BCGFFT). Next, the normalized incident field for each receiver location is computed at all points in the object domain, which are used in Eqn. (41) to obtain the vector Green's function for each receiver location. Finally, the normalized total field and vector Green's functions are used in Eqn. (43), where we evaluate the integral by summing over the cubic voxels.

Figure 12:
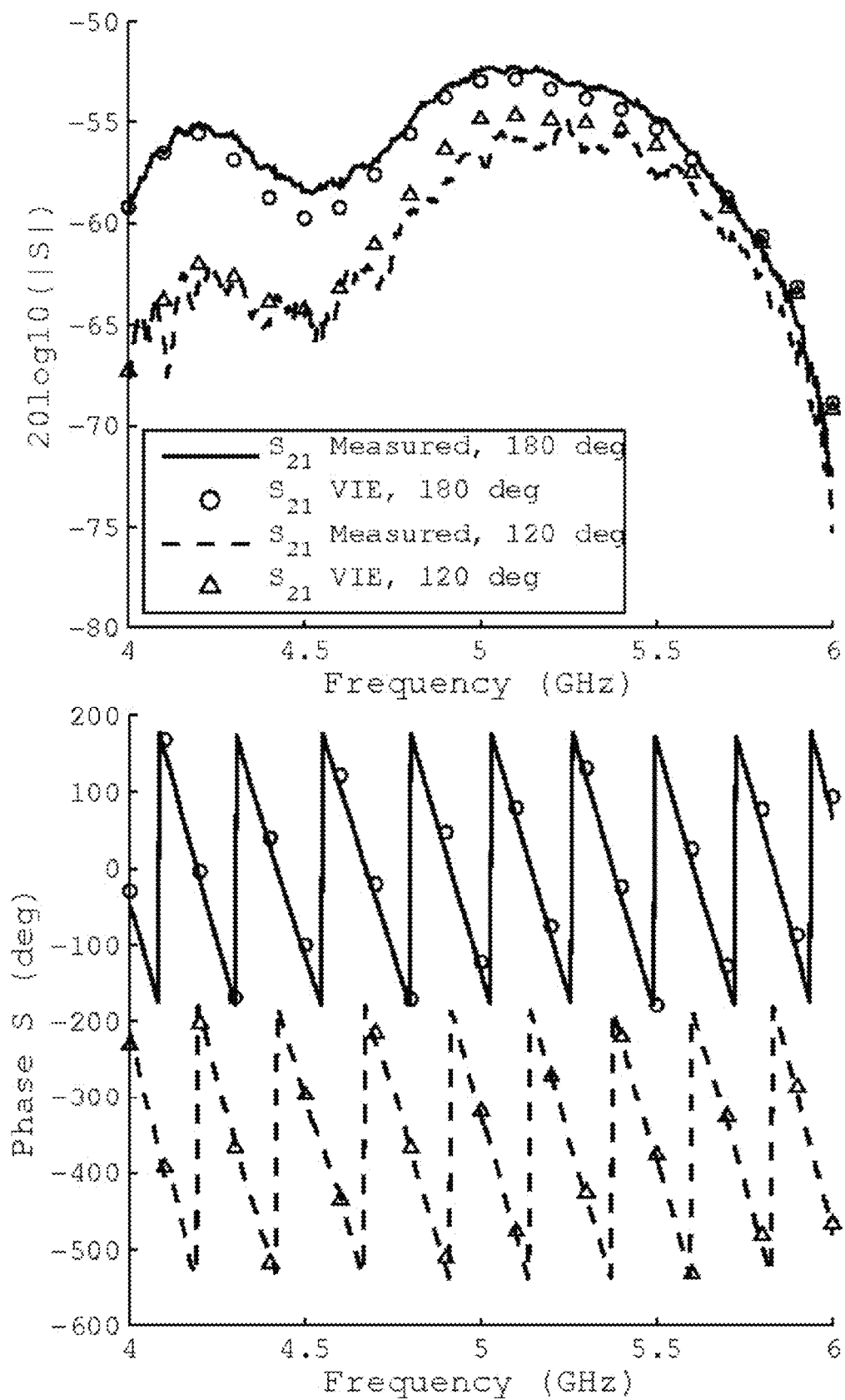
FIG. 12 shows magnitude and phase plots of the measured and predicted $S_{21}$ S-parameters for the example setup of FIG. 10.

FIG. 12 shows the magnitude and phase of measured and predicted $S_{21}$ for the scattered field for the pair of spheres at receiver angles of 120 degrees and 180 degrees (see also FIG. 10). Solid line and dots illustrate measured and predicted $S_{21}$ for a receiver at 180 degrees, and dashed line and triangles illustrate $S_{21}$ for a receiver at 120 degrees, where the second set of phases is shifted by 360 degrees for display. The magnitude of measured and predicted $S_{21}$ agree to better than 2 dB across the band (at −50 dB levels or less). The phase agrees overall to better than 20 degrees.

This example shows that the VIE can be used in conjunction with the vector Green's function and a numeric volumetric forward solver to predict $S_{21}$ for the scattered field with a phase much better than $\lambda/10$, i.e., 36 degrees, which is a common metric for many microwave systems.

According to a second exemplary experiment, Eqn. (43) is used to predict $S_{11}$ for the setup in FIG. 13. The same procedure is used as in the first exemplary experiment, however, here the scattered field $S_{11}$ are predicted for a single acrylic sphere.

Figure 13:
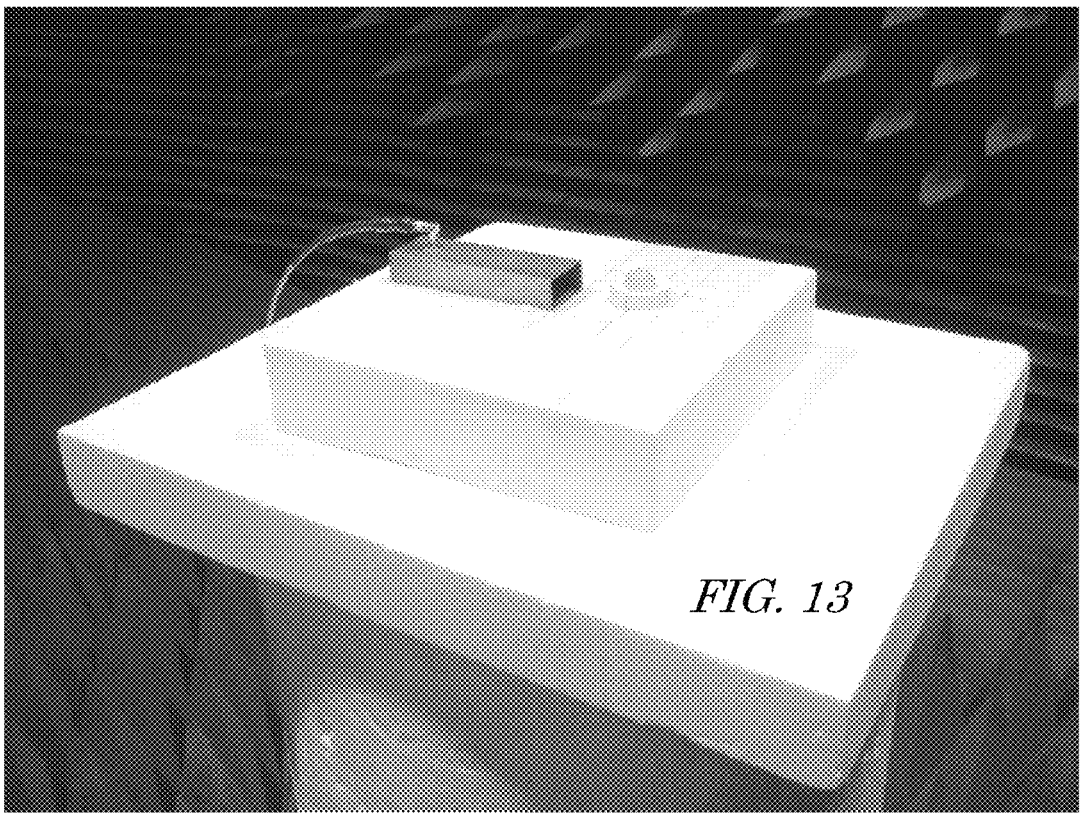
FIG. 13 shows a second example setup for a single acrylic sphere placed in an anechoic chamber.
Figure 14:
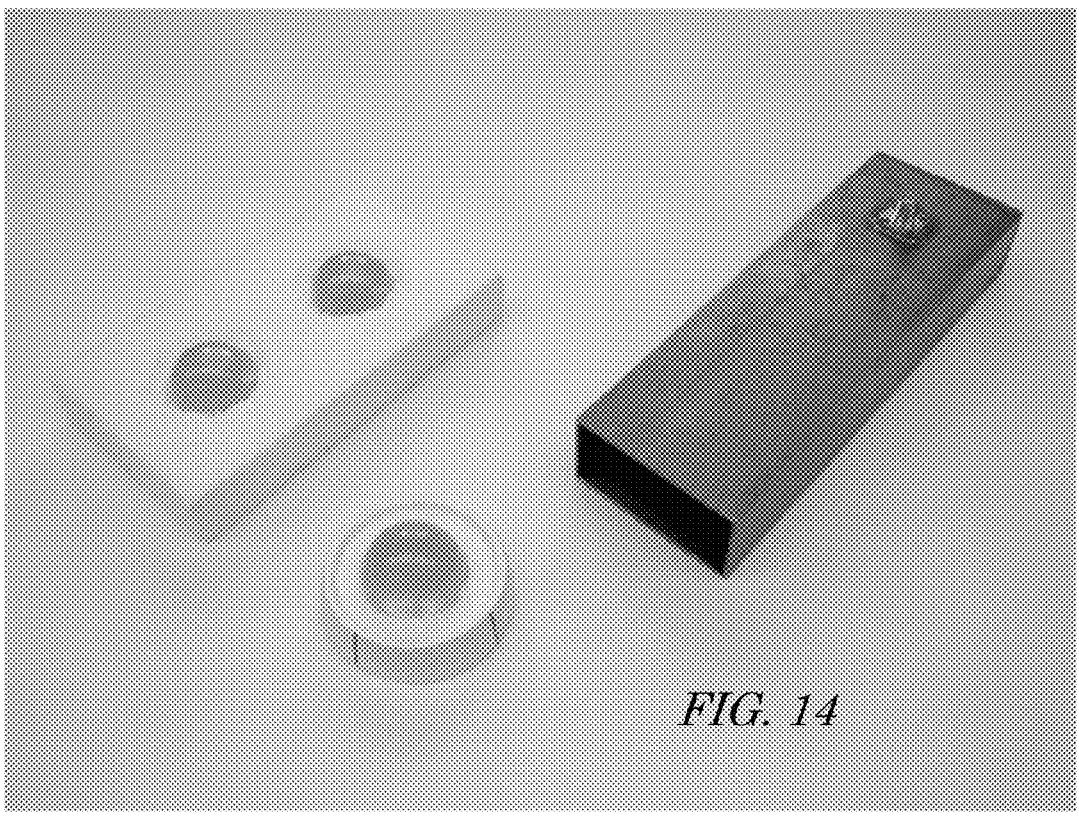
FIG. 14 shows one of the waveguides and the single and pair of acrylic spheres used in the first and second examples.

One waveguide is supported by Styrofoam in an anechoic chamber, show in FIG. 13. The sphere is held in a Styrofoam and placed two inches in front of the waveguide and one inch to the side of the boresight. The Stryofoam holder is included in the incident field measurement, and it is shown in FIG. 14.

After evaluating the incident field in the object domain, the normalized total field in the object region is computed again with the BCGFFT. The same incident field is used for the vector Green's function because we are predicting $S_{11}$.

Figure 15:
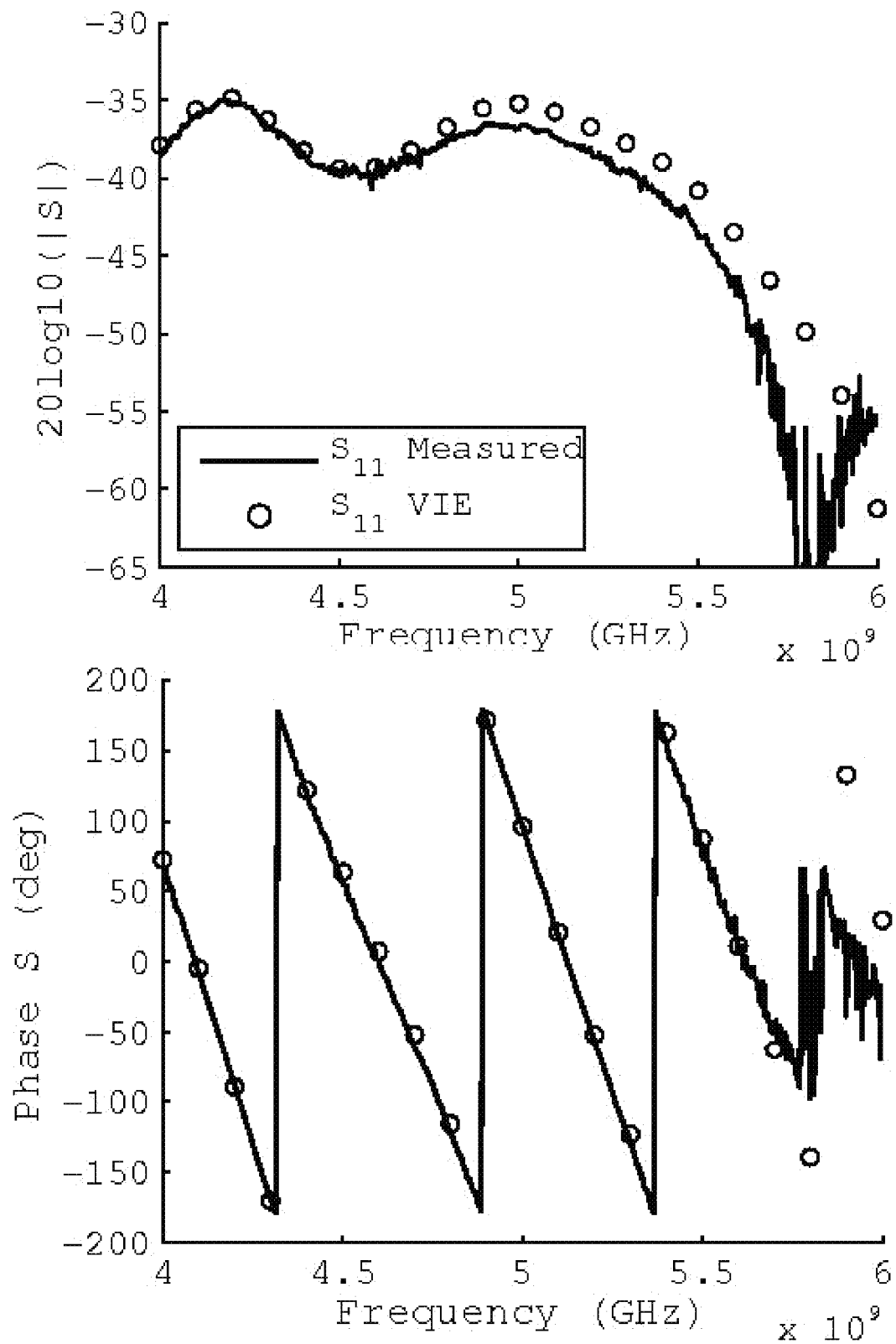
FIG. 15 shows magnitude and phase plots of the measured and predicted $S_{11}$ S-parameters for the example setup of FIG. 13.

From FIG. 15, it can be seen that the magnitude of measured and predicted $S_{11}$ agree well up to 5 GHz and differ by about 2 dB through 5.6 GHz. The phase agrees to within 10 degrees up to 5.6 GHz. It is clear from the phase that there is some loss in sensitivity above 5.6 GHz. The difference in magnitude between measurements and predictions may be attributable to the lack of multiple scattering in the model, especially as the object becomes electrically larger. Furthermore, the location of the sphere is near the radius of the source dimension for the multipole expansion of the waveguide fields, which will render the incident field computation invalid. Even with these errors, this example demonstrates that reasonable predictions of $S_{11}$ are possible.

According to a third exemplary experiment, a test is performed for the vector Green's function and VIE in simulation. Simulated and predicted scattered field S-parameters are compared of an arbitrary distribution of inhomogeneous dielectric objects in a near-field scenario using HFSS. No assumptions are made about the nature of the field solution. This example supports the argument that Eqn. (41) holds for any geometry.

Figure 16:
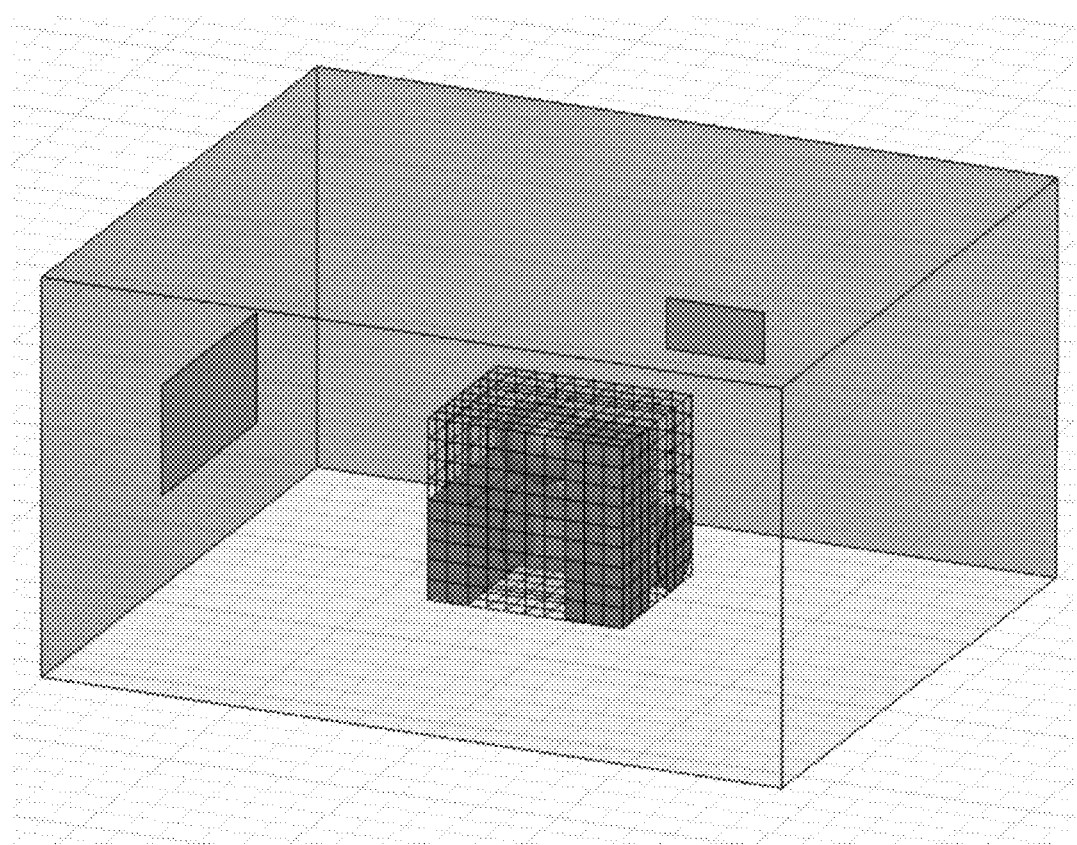
FIG. 16 is an HFSS CAD model for a third example which uses a simulation of two different sized apertures embedded within PEC walls.

The simulation domain is shown in FIG. 16, which is a HFSS CAD model for the third experiment. The exemplary setup shown in FIG. 16 includes two different sized apertures embedded in PEC walls and the object domain has four dielectric objects and is meshed with a sparse, unassigned grid to constraint the HFSS adaptive meshing. The simulation region has dimensions of 32 cm×38 cm×20 cm, and the object domain is 8 cm×10 cm×9 cm. The 2-ports are apertures in PEC walls. The dimensions of the apertures for ports 1 and 2 correspond to WR-430 and WR-187 waveguides, respectively, with characteristic impedances of 250 Ohms and 450 Ohms. The other four sides of the simulation region are radiation boundaries. The dielectric objects are a Teflon sphere, cylinder, and two blocks, with permittivities of 2.1.

HFSS is used to both simulate the 2-port S-parameters as well as estimate the incident and total fields in the object region. Because of the proximity of the objects to the apertures, this is a near-field problem where the multiple scattering between the PEC walls and the objects is included in both the incident and total fields.

First, the direct 2-port scattered field S-parameters were simulated between 3-4 GHz, which are treated as the measurement. Next, the incident and total fields were computed by HFSS in the object domain at 21 discrete frequencies between 3-4 GHz. The fields were sampled on a fine Cartesian grid across the object domain. The grid spacing was 2.5 mm, which is ~λ/20 at 4 GHz in Teflon. Because HFSS computes volume fields by interpolating across the Finite Element mesh, a sparse grid of unassigned sheets was superimposed through the domain before simulation (shown in FIG. 16). Experience has shown that this sparse grid helps constrain the adaptive meshing of HFSS providing more accurate interpolation on the finely sampled Cartesian grid. The surface sheets of the sparse grid are separated by 9 mm in all three dimensions, which is ~λ/6. The sampled incident and total fields were then used in Eqn. (59) to predict all four S-parameters. The integral was computed with the trapezoidal method. The average power on the transmission lines are again 1 Watt, so the line voltages are given by $a_o^i = \sqrt{2Z_o^i}$ and $a_o^j = \sqrt{2Z_o^j}$, specific to each port.

Figure 17:
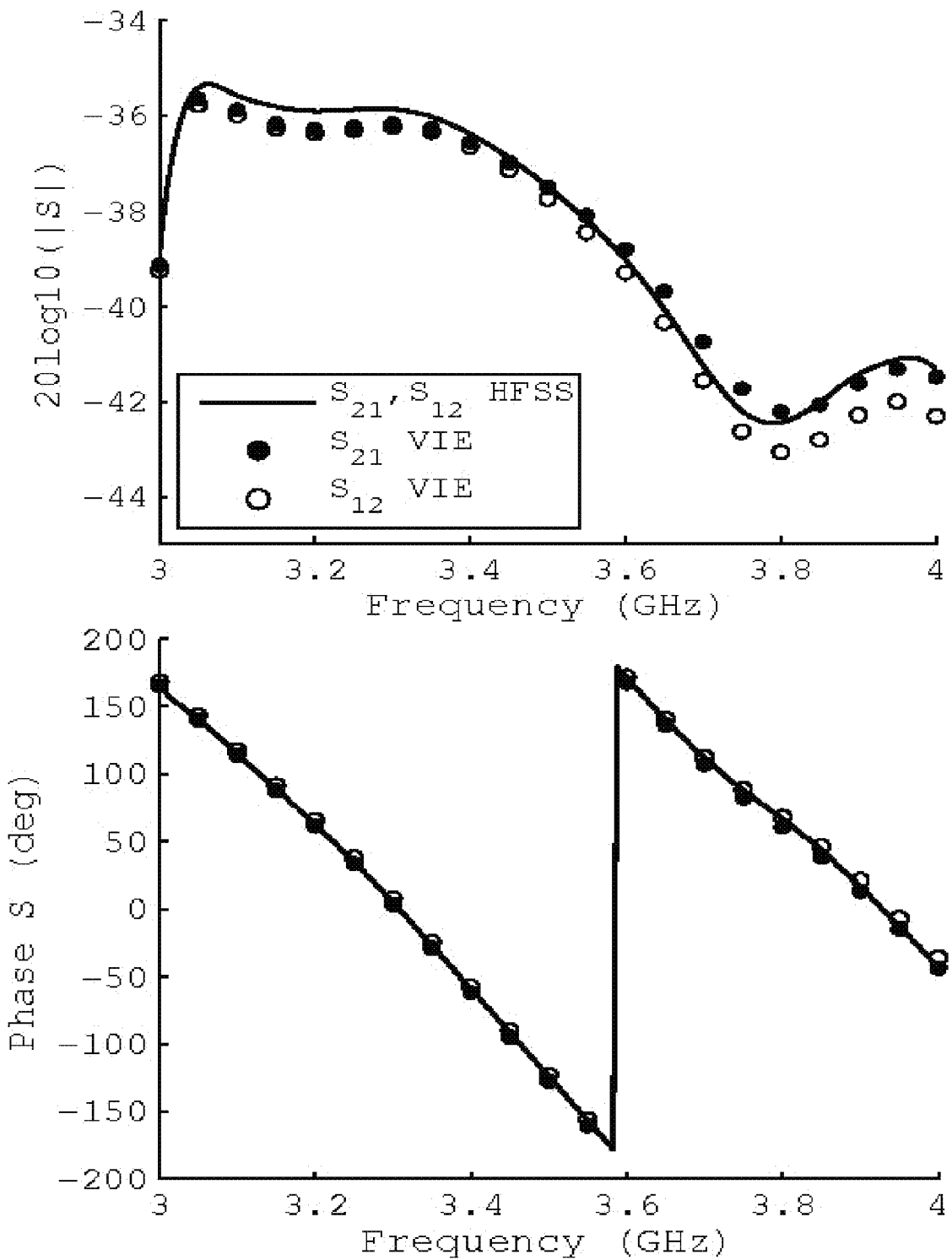
FIG. 17 shows magnitude and phase plots of simulated and predicted $S_{21}$ and $S_{12}$ S-parameters for the simulated third example.
Figure 18:
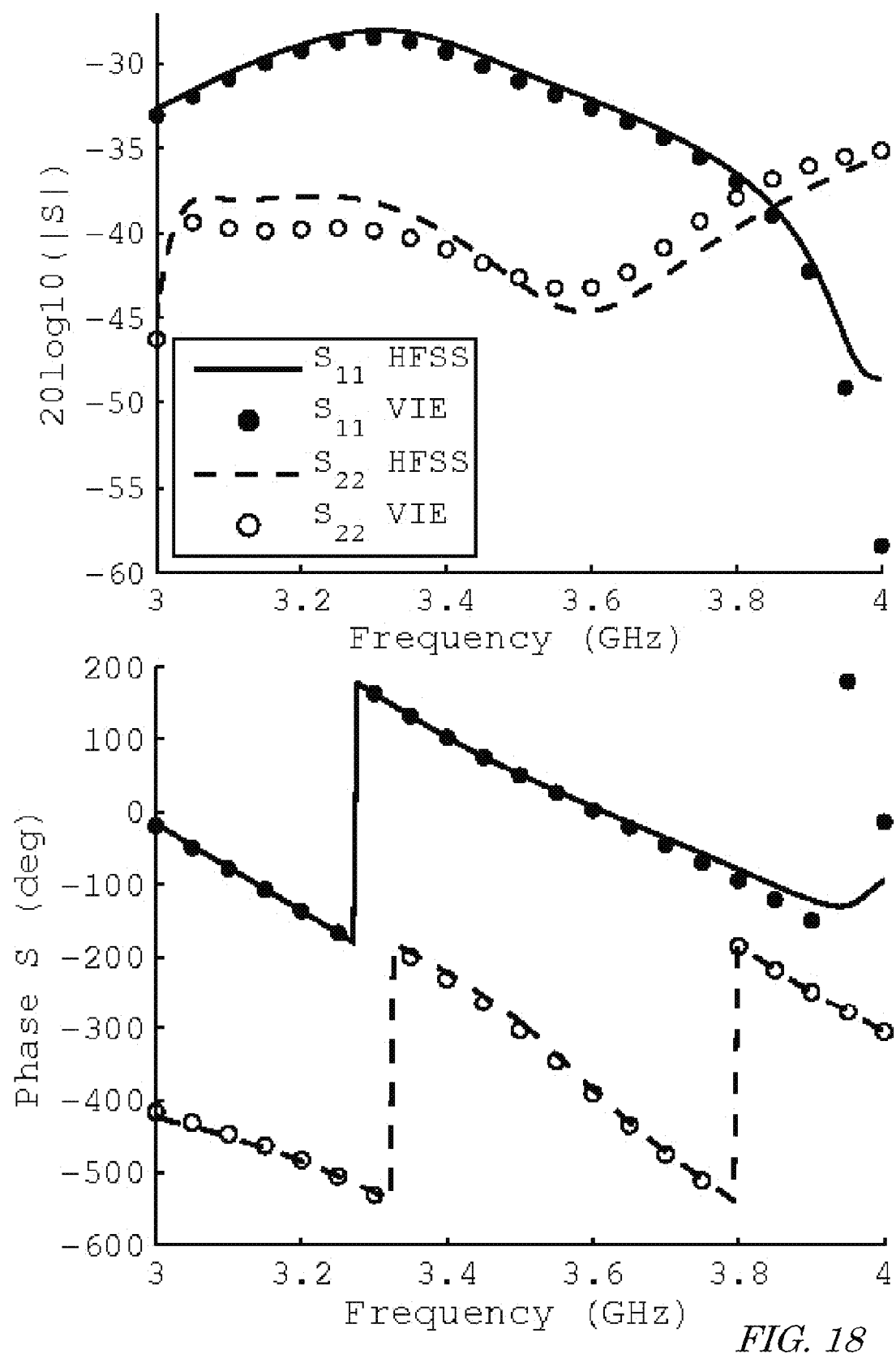
FIG. 18 shows magnitude and phase plots of simulated and predicted $S_{11}$ and $S_{22}$ S-parameters for the simulated third example.

FIGS. 17 and 18 show simulated and predicted 2-port scattered field S-parameters. Overall, simulated and predicted $S_{21}$ and $S_{12}$ agree to within 1 dB in magnitude and 8 degrees in phase, while $S_{11}$ and $S_{22}$ agree to within 2 dB in magnitude and 10 degrees in phase. The system is reciprocal, so all values of $S_{21}$ and $S_{12}$ should be equal. The HFSS simulation yields identical values, but some asymmetries are present between predicted $S_{21}$ and $S_{12}$, which may be attributable to interpolation and numeric integration errors. This data confirms the generalization previously described, that the incident field can be used as the vector Green's function in the absence of analytic expressions.

Figure 19:
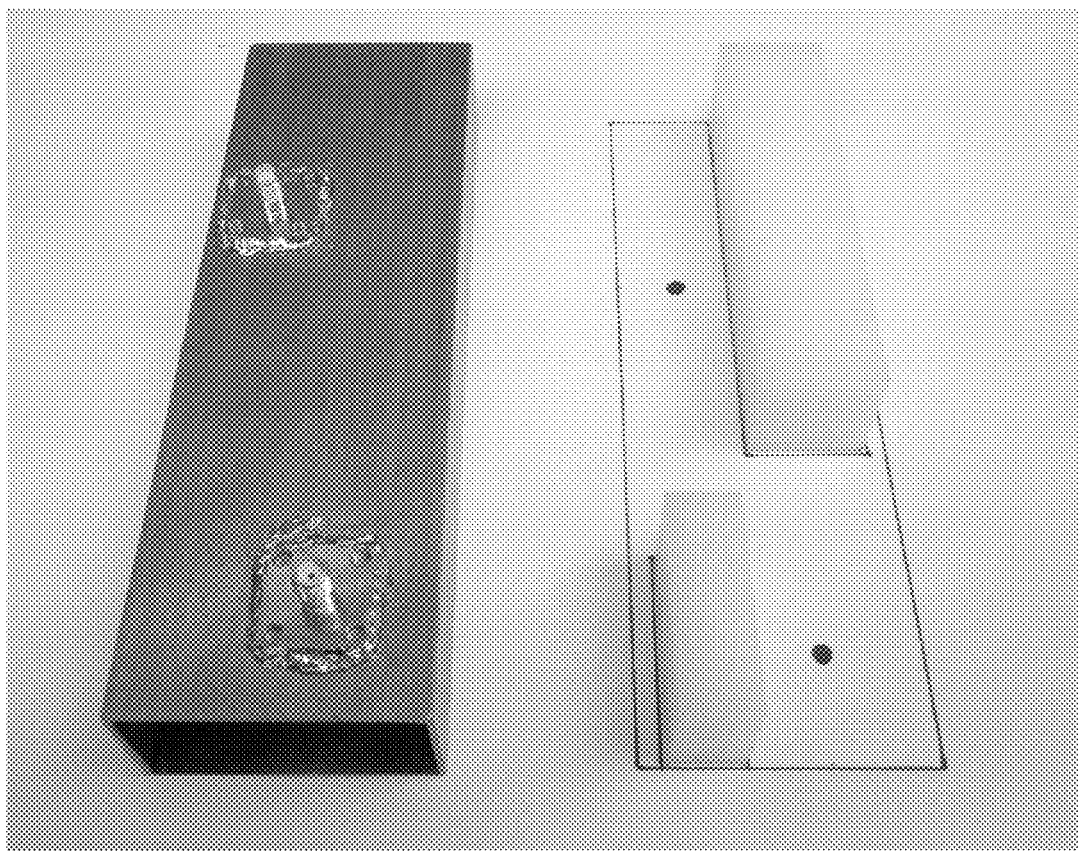
FIG. 19 shows components for a dielectrically loaded waveguide for a fourth example with the empty waveguide shown along with two nylon blocks that make up the load and object domains.
Figure 20:
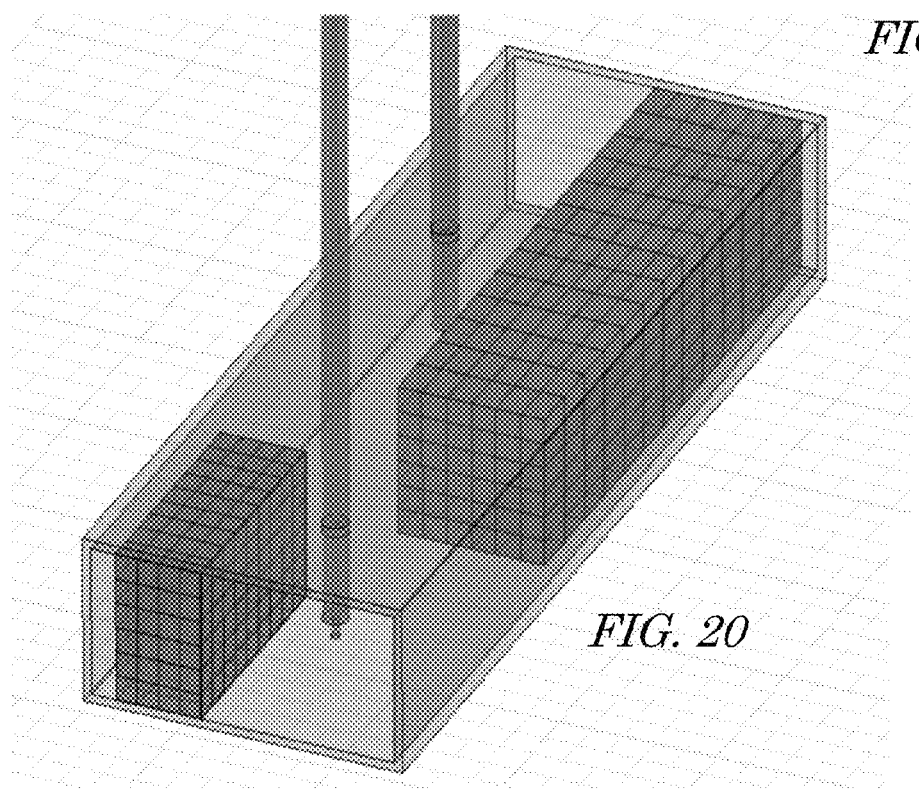
FIG. 20 is an HFSS CAD model of the assembled dielectrically loaded waveguide of FIG. 19.

According to a fourth exemplary experiment, 2-port scattered field S-parameters were simulated and predicted with respect to experimental measurements. The simulations and predictions follow the procedure in the third experiment, but were validated with an experiment. The structure tested was a dielectrically loaded waveguide. The physical waveguide and dielectric load are shown in FIG. 19, where an empty waveguide is shown at left and two nylon blocks making up the load and object domains are shown at right. Its HFSS CAD model is shown in FIG. 20, where the object domains are meshed with an unassigned sheet grid to constrain the adaptive meshing of HFSS and the waveguide is also enclosed in a large radiation box (not depicted). The coaxial lines extend to the radiation boundary and are de-embedded to the reference planes used by the VNA for the physical waveguide. This example also supports the argument that Eqn. (41) holds for any geometry.

The waveguide body is the same as those used the first and second examples but the ends of the waveguide are left open to prevent cavity resonances which may lead to inaccurate HFSS simulations. The probes are SMA female flange mounts with an extended dielectric. One probe is located 1.91 cm inward from one corner along both axes, and the other is located 2.54 cm and 1.27 cm inward from the other corner.

The dielectric load is composed of two rectangular, nylon blocks having a relative permittivity of 2.93 and assumed lossless. The blocks were machined to fit tightly in the vertical direction to limit the air gap at the metal surface and preserve the dielectric-metal boundary conditions. The blocks had dimensions of 3.78 cm×1.34 cm×2.28 cm and 9.26 cm×2.33 cm×2.28 cm. The probe locations and block dimensions were chosen to break any structural symmetries.

Measurements were performed between 4-6 GHz in an anechoic chamber (not pictured). In order to accurately model the positions of the nylon blocks in the CAD model, the dielectric blocks were inserted and aligned in the physical waveguide. These locations were recorded and used in HFSS. In experiment, the total field S-parameters were measured first, after which the blocks were removed and the incident field S-parameters were measured, the difference being the scattered field S-parameters.

The simulated and predicted scattered field S-parameters were computed just as in the third example. The incident and total fields were computed at 41 discrete frequencies between 4-6 GHz. Because both dielectric blocks contribute to the scattered field, the incident and total fields were computed by HFSS in both object regions and the VIE was integrated over both. In addition, the HFSS probes were de-embedded so that the simulation reference planes matched the reference planes used by the vector network analyzer (VNA). This de-embedding correction was also applied to the computed incident and total fields.

Figure 21:
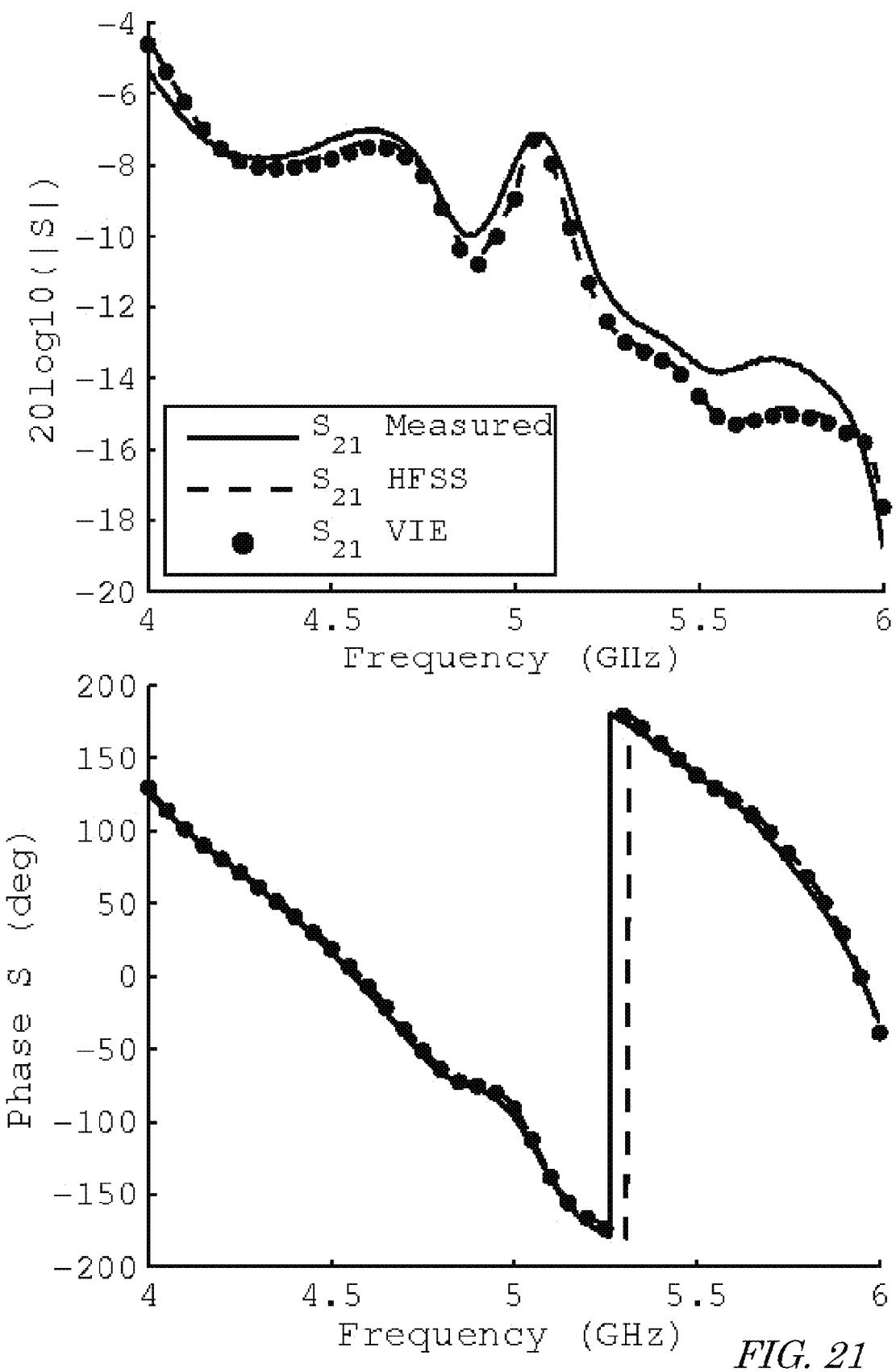
FIG. 21 shows magnitude and phase plots of the measured, simulated, and predicted $S_{21}$ S-parameters for the example setup of FIGS. 19 and 20.
Figure 22:
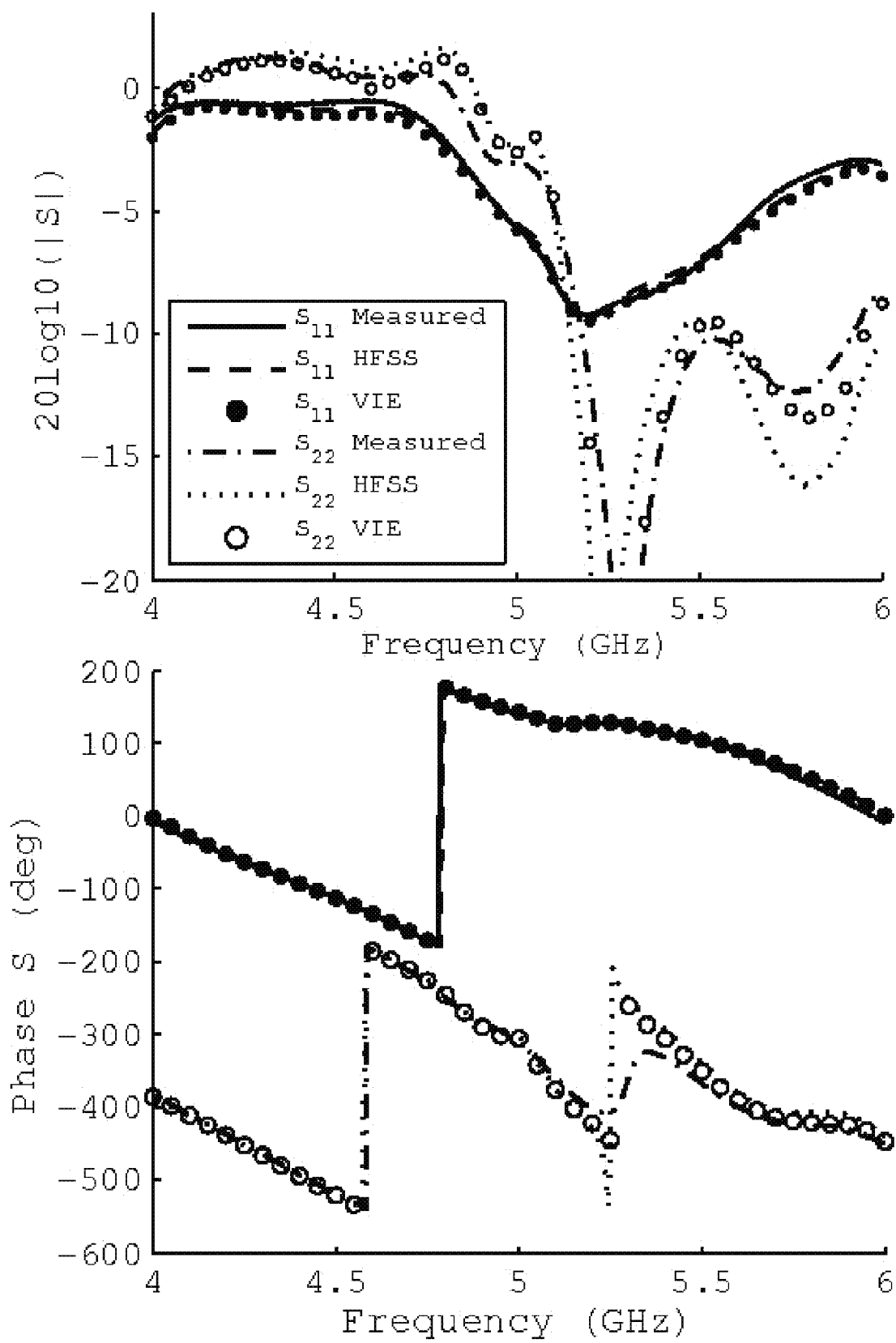
FIG. 22 shows magnitude and phase plots of the measured, simulated, and predicted $S_{11}$ and $S_{22}$ S-parameters for the example setup of FIGS. 19 and 20.

FIGS. 21 and 22 show the magnitude and phase of measured, simulated, and predicted scattered field S-parameters. In those figures, the solid line illustrates measured $S_{21}$, the dashed line represents $S_{21}$ computed by HFSS, and the dots represent $S_{21}$ predicted by the VIE and vector Green's function. The magnitude of simulated and predicted $S_{21}$ match to better than 0.2 dB, and both match the measurements to better than 2 dB across the band. The phases of all three agree to better than 8 degrees. Similar results were obtained for $S_{12}$. The magnitude of $S_{11}$ of all three quantities agrees to within 1 dB, and the phase better than 10 degrees. $S_{22}$, however, does not agree as well in magnitude due in part to the sensitivity of reflection measurements near resonance. The $S_{22}$ phases diverge at resonance, but are otherwise within 10 degrees. Note that the magnitude of $S_{22}$ is greater than 0 dB in the range from 4-5 GHz, because the scattered field magnitude can be greater than the incident or total fields individually. This can be confirmed mathematically by applying the triangle inequality to Eqn. (35).

While the measurements and predictions match well in each example, a brief discussion of some sources of error may be appropriate.

For Examples 1 and 2, the errors may be traced through the computational steps. First, and probably the largest contribution to error for the free-space predictions, is the fitting procedure used for the transmit coefficients of the antenna model. This uses a least squares criterion to find an equivalent multipole expansion to fields generated by HFSS. The accuracy of the fit depends on the accuracy of HFSS and number of field data used to find the multipole expansion. The next source of error is the evaluation of the incident field used for the vector Green's function and the BCGFFT. This is obtained by summing over a finite number of the free-space vector wave functions, where inaccuracies will undoubtedly be present. The third source of error is the normalized total field solution given by the BCGFFT. While we validated the BCGFFT with analytic solutions, the spheres must be approximated with their discretized counterparts. Finally, the computation of the VIE itself will be prone to integration errors even for high spatial sampling rates. For Example 2, we have the additional problem that the object is so close to the waveguide that the multipole expansion for the field may not be accurate, and that the effects of multiple scattering, which are non-negligible at that range, are not included in the vector Green's function or the total field computation. Furthermore, the positions and angles of antennas and objects in the experiments were measured by hand, and VNA measurements are subject to some, though small, calibration errors. Last, there is uncertainty in our knowledge of the dielectric constant of the acrylic spheres.

Errors in Example 3 are purely numeric. This example also helps to show us the internal consistency of HFSS. The largest source of error is the interpolation of the FEM CAD mesh to obtain the volume fields. An attempt was made to mitigate this with the undefined, sparse sheet grid. Integration errors when computing the VIE are also present.

Finally, for Example 4, differences between measured and predicted scattered field S-parameters are due in large part to CAD model inaccuracies and structural resonances that cannot be accurately simulated. This example is also affected by HFSS interpolation errors, VIE integration errors, and uncertainties in the dielectric constant of the objects.

The four examples demonstrate the use of the vector Green's function and VIE in simulation and measurement.

Examples 1 and 2 demonstrated that the scattered field S-parameters can be predicted for objects in free space by using the vector Green's function, the VIE, and a full-wave antenna model. The antenna model allowed us to compute the normalized incident field in the object domain, which we used for the vector Green's function and to find the normalized total field using a volumetric forward solver.

Examples 3 and 4 demonstrated that the methods apply to arbitrarily complex geometries, which can include near-field effects. It has been shown that only the incident field needs to be obtained to find the vector Green's function. We can use the VIE and S-parameters to study scattering phenomena of inhomogeneous material in near-field scenarios, such as cavities, where the background multiple scattering can be accounted for by the vector Green's function.

We have derived a vector Green's function for S-parameter measurements of the electric field volume integral equation for inhomogeneous media. This formulation directly links the object properties to microwave measurements through a source model in a way that is useful for many applications. We have demonstrated how to obtain the vector Green's function from simulation and validated the model with both simulation and experiment in near-field and free-space scenarios. As discussed below, the vector Green's function and VIE may be used as the core of an S-parameter based inverse scattering algorithm and experiment.

Figure 23:
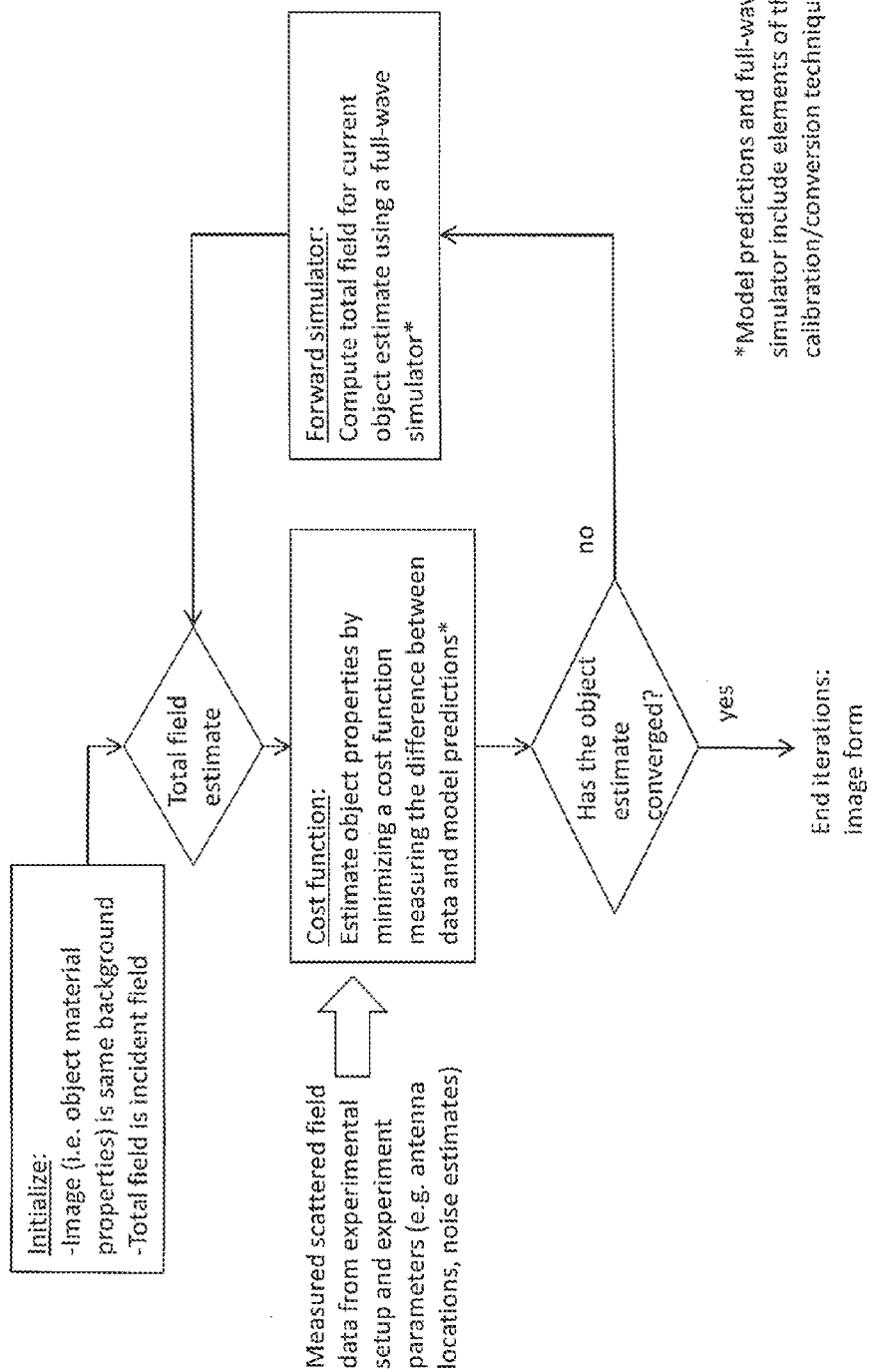
FIG. 23 is a block diagram of an inverse scattering process.

An additional flowchart depicting such an inverse scattering process is shown in FIG. 23 and is discussed below in more detail. The results of a free-space microwave inverse scattering experiment are presented, where the Born Iterative Method with a new integral equation operator that directly links the material contrasts we wish to image to S-parameter measurements of a Vector Network Analyzer are described. This is done with a full-wave antenna model based on the source-scattering matrix formulation. This model allows one to absolutely calibrate an inverse scattering setup without the need for calibration targets.

While microwave inverse scattering has been extensively studied in theory, comparatively few experiments have demonstrated their use in practice. One of the most difficult aspects of experimental inverse scattering is source characterization. That is, how to relate the electric field predictions in the algorithms to antenna voltage measurements in experiment. This problem is not usually treated comprehensively by the inverse scattering community when developing algorithms or when performing experiments. The description below demonstrates how to use a full-wave antenna model to make an inverse scattering algorithm and S-parameter based experiment consistent.

Inverse scattering algorithms estimate material contrasts by comparing forward model predictions to measurements using a cost function. The forward model is typically a volume integral equation giving the scattered electric field at observations points. However, the same scattered field cannot be measured directly in experiment; we measure a voltage response at the output of an antenna. To properly compare forward model predictions to measurements, these two quantities must have the same units. One can either calibrate the setup to covert measured voltages to measured scattered fields, or use an antenna model to convert predicted scattered fields to predicted voltages.

The choice of whether to calibrate a setup or characterize an antenna depends on what assumptions apply in the experiment. In some instances, far-field assumptions may apply. A precisely located calibration target is used to determine a single complex parameter relating voltage measurements to plane wave amplitudes. Voltage measurements are mapped back to scattered fields. However, we often cannot make plane wave assumptions, for instance in small laboratory setups where the antennas are in the quasi near-field, or use calibration targets, for instance, in half space inverse problems. In these cases, we must absolutely characterize the antenna response with a model to map scattered field predictions to voltage predictions. This necessarily changes the forward model and affects the downstream implementation of the inversion algorithm.

The inversion algorithm tested and described below is the Born Iterative Method (BIM). The BIM alternates estimates between the material contrasts and the total fields in the object. Two substantial changes to traditional implementations of the BIM have been made to perform proper experiments. First, a new volume integral operator is used as the forward model, using an antenna model based on the source scattering matrix formulation. This operator allows one to directly predict the scattered field S-parameters measured by a Vector Network Analyzer (VNA) due to a material contrast in a bi-static antenna setup without the use of calibration targets. However, care must be taken to ensure that the antenna characterization, VNA calibration, and experimental setup are consistent, as explained below. Second, instead of estimating the contrasts by solving a large linear system of equations, the covariance-based cost function is directly minimized. This cost function: 1) provides physically meaningful regularization, the parameters of which come directly from experiment, and 2) provides a framework for deriving the transpose of the new operator.

This algorithm and antenna model are experimentally validated with a free-space setup. Images of the 2D dielectric profiles of finite cylindrical objects are formed using a full 3D inverse scattering algorithm and 2D source geometry. The shapes of different objects are discernible even though the contrast value is often underestimated. The algorithm may break down for large contrast objects too closely spaced for this source geometry.

Application of this algorithm and characterization to 3D source geometries and adapting these techniques here to microwave and ultrasound medical imaging applications is certainly envisioned.

The antenna model is used to transform the integral equations into equations that will be consistent with S-parameters measured by a VNA. First, characterizing the source or measuring the incident field directly. Second, the cost function compares the forward model predictions to the measured data, so these two quantities should have the same units. For example, if the data is S-parameters, then the forward operator should predict S-parameters; it is not correct to simply compare predicted electric fields to S-parameter measurements. Last, when developing the routine to minimize the cost function, which is often based on conjugate gradients, the transpose of the forward operator is required and the derivation of the transpose can change depending on the form of the forward operator. If the forward operator includes the source characterization, then we must derive the transpose accordingly.

First, we write Eqn. (1) in terms of the normalized incident and total fields by dividing both sides by $a_o$, $$e(r) = e_{inc}(r) + \int G(r,r') \cdot O(r) e(r') dV' \quad (62)$$

This is the integral equation that will be used to represent the forward scattering solution. It is solved with the same methods used to solve Eqn. (1), e.g. FDTD, CGFFT, Neumann Series, but with $e_{inc}(r)$ used in place of $E_{inc}(r)$.

This antenna model may be used with the normalized fields, so that it is possible to transform the scattered field volume integral equation given by Eqn. (8) into one that directly predicts S-parameters. This new integral equation implicitly includes the antenna model, and gives a new integral operator so that the model predictions can be properly compared to measurements in the inversion algorithm.

Figure 24:
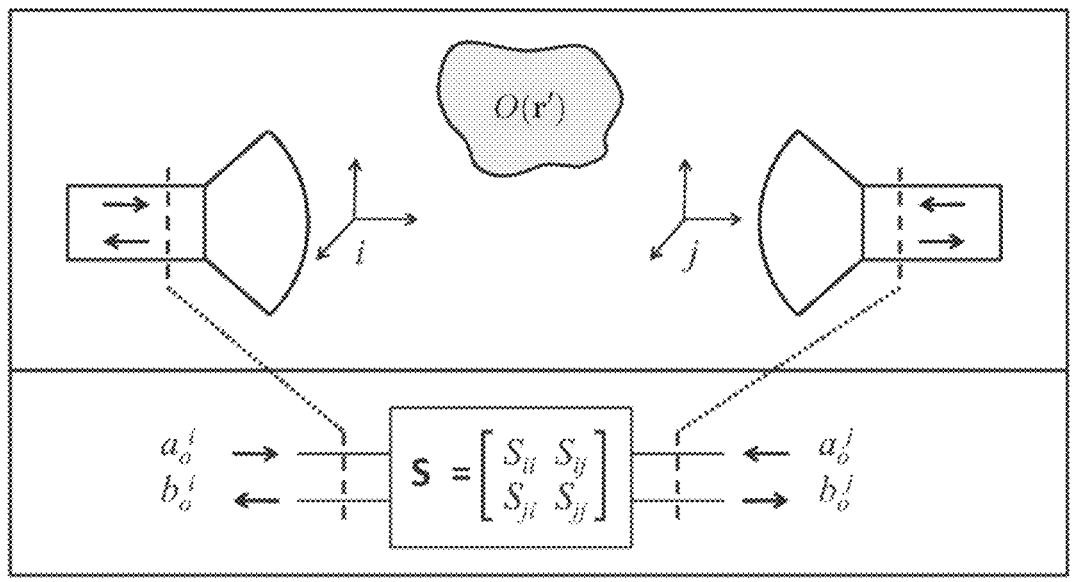
FIG. 24 shows a network model of two antennas and a scattering object, as in FIG. 8.

Let there be two antennas, one transmitting in reference frame i and the other receiving in reference frame j. Each antenna has its own set of transmit coefficients and transmission line reference plane, shown in FIG. 24. The two-port scattered field S-parameter, $S_{ji,sca}$, measured between the two antennas in the presence of an object is then given by $$S_{ji,sca} = \int g_j(r) \cdot O(r) e_i(r) dV \quad (63)$$

where $e_i(r)$ is the normalized total object field produced by the transmitter and $g_j(r)$ is the vector Green's function kernel for the receiver. This assumes any multiple scattering between the antennas and object is negligible.

It can also be shown by reciprocity that $g_j(r)$ is related to the normalized incident field of the receiver as $$g_j(r) = \frac{iZ_0^j}{2\omega\mu} e_{inc,j}(r) \quad (64)$$

where $\omega$ is the operating frequency in radians, $\mu$ is the background permeability, and $Z_o^j$ is the characteristic impedance of the receiver transmission line.

Equations (62) and (63) are the integral equations that will be used for the inverse scattering algorithm. They consistently link the physics of the electromagnetic inverse scattering problem to an S-parameter measurement system through a full-wave antenna model. The antenna model allows one to compute fields that are properly normalized for S-parameter measurements to be used in Eqns. (62), (63), and (64). If the antenna transmit coefficients and locations are known accurately enough, then no other step is required to calibrate a free-space experimental inverse scattering system except to calibrate the transmission line reference planes. Equation (63), in fact, requires less storage and computation than Equation (8) where one would have to use the dyadic Green's function in order to compute vector fields.

Finally, in experiment, one generally cannot measure the scattered field S-parameter directly, but can obtain it by subtracting the S-parameters for the total and incident fields $$S_{ji,sca} = S_{ji,tot} - S_{ji,inc} \quad (65)$$

where $S_{ji,inc}$ is measured in the absence of the object, and $S_{ji,tot}$ is measured in the presence of the object.

The Born Iterative Method (BIM) and its counterpart the Distorted Born Iterative method (DBIM), have been extensively studied in theory and been implemented only a few times in experiment. In effect, the BIM successively linearizes the nonlinear problem by alternating estimates of the contrasts and the object fields according to the following algorithm:
1. Assume the object fields are the incident field (Born approximation).
2. Given the measured scattered field data, estimate the contrasts with the current object fields by minimizing a suitable cost function.
3. Run the forward solver with current contrasts. Store the updated object field.
4. Repeat at step 2 until convergence.

Our aim is to test the BIM in experiment using the new integral equations which include the source model. While implementing the forward solver with Eqn. (62) may be standard enough, the cost function is developed around Eqn. (63). This scattered field integral operator is substantially different from traditional forms, and will affect the derivation of the minimization steps, specifically the operator transpose.

The use of the forward solver in the BIM enforces the constraint that the object fields satisfy the wave equation for the current object at each iteration. The BCGFFT may be used for the forward solver, and it was validated against the Neumann Series up to contrasts of 2:1 and validated against the Mei scattering solution up to contrasts of 4:1.

The choice of the cost function is not trivial, because it and the form of regularization may have more effect on the final image than the number of data. Unlike traditional formulations of the BIM, which build and solve a linear system of equations over Eqn. (8) to update the contrasts, we minimize a functional over Eqn. (63) using a multi-variate covariance-based cost function. We use this cost function for three reasons, 1) it has the probabilistic interpretation that the model parameters and forward model predictions are Gaussian random variables, for which inverse covariance operators provide physically meaningful regularization, the parameters of which come directly from experiment, avoiding the need for turning parameters, 2) it gives a unified framework for analytically deriving the transpose of the forward operator in weighted spaces, and 3) this cost function can be minimized with conjugate gradients avoiding the need to build and solve a large linear system of equations.

At each iteration when the contrast is estimated, it is assumed the object field is constant. The scattered field integral with constant object field is then a linear operator acting on the contrast. With this in mind, the cost function can be written as $$2S(m) = \|G_1 m_1 + G_2 m_2 - d\|_D^2 + \sum_{m=1,2} \|m_m - m_{a,m}\|_{M,m}^2 \quad (66)$$

where $$[G_m]_{ji} = c_m \int g_j(r') \cdot (\cdot) e_i(r') dV' \quad (67)$$

$$[d]_{ji} = S_{ji,sca} \quad (68)$$

$$m_1 = \delta\epsilon(r) \quad (69)$$

$$m_2 = \delta\sigma(r) \quad (70)$$

-continued $$c_1 = k_o^2 \quad (71)$$

$$c_2 = k_o^2 \frac{i}{\epsilon_b \omega} \quad (72)$$

with frequency dependence understood. The quantity G is the forward operator, and Gm is a vector of forward model predictions. The quantity d is the data vector containing the measured scattered field S-parameters. The vectors $m_1$ and $m_2$ contain the contrast pixel values for a discretized domain. It is assumed that the permittivity and conductivity contrasts are independent so each has its own regularization term. The vector norms are defined over the data and model spaces, respectively, through inverse covariance operators.

The gradient vector and steepest decent vectors for the two model vectors are independent and given by $$\hat{\gamma}_m = G_m^* C_D^{-1} r + C_{M,m}^{-1}(m_m - m_{a,m}) \quad (73)$$

$$\gamma_m = C_{M,m} G_m^* C_D^{-1} r + m_m - m_{a,m} \quad (74)$$

for m=1, 2, and where $r=G(c_1 m_1 + c_2 m_2) - d$, is the residual. The transpose of the forward operator is similar for both object functions $$G_m^* u = c_m^* \sum_{ji} (g_j(r) \cdot e_i(r))^* u_{ji} \quad (75)$$

where * is simply conjugate, and the vector u is a vector in the weighted data space. The transpose can be thought of as a form of aggregate back projection, which maps data quantities onto the object domain. It should be noted that the transposes for the permittivity and conductivity only differ by a constant.

The operator transpose differs from those derived traditionally for full-wave scattering problems, because an integral equation is used which predicts S-parameters instead of fields.

The conjugate gradient updates of the model parameters are $$m_{mn} = m_{mn-1} - \alpha_n v_{mn} \quad (76)$$

$$v_{mn} = \gamma_{mn} + \beta_{mn} v_{mn-1} \quad (77)$$

For $\beta_{mn}$, the Polak-Ribiere step was used given by $$\beta_{mn} = \frac{\langle C_{M,m}^{-1}(\gamma_{mn} - \gamma_{mn-1}), \gamma_{mn} \rangle}{\langle C_{M,m}^{-1} \gamma_{mn-1}, \gamma_{mn-1} \rangle} \quad (78)$$

where <, > is a simple dot product. Choosing $\alpha_n$ to minimize the cost function at each step, it can be shown that, $$\alpha_n = \frac{\Re\left\{\sum_{m=1}^{2} (v_{mn}, \gamma_{mn})_{M,m}\right\}}{\|s_n\|_D^2 + \sum_{m=1}^{2} \|v_{mn}\|_{M,m}^2} \quad (79)$$

where $s_n = G(c_1 v_{1n} + c_2 v_{2n})$.

Figure 25:
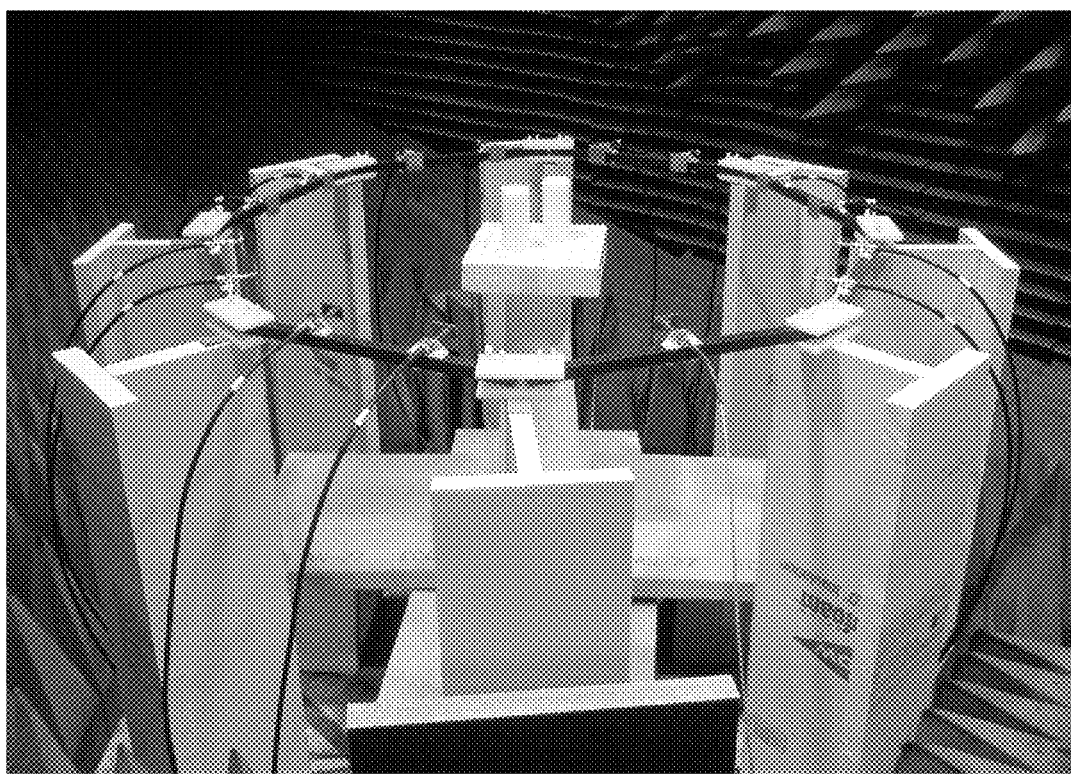
FIG. 25 shows an antenna setup used to test the inverse scattering method of FIG. 23 using fifteen antennas arranged around a target object.

To test the inverse scattering algorithm in conjunction with the source characterization, the setup shown in FIG. 25 was constructed. Fifteen antennas are mounted to a ridged nylon octagon. The octagon is supported on eight, 4' Styrofoam pedestals in an anechoic chamber. One antenna is a transmitter, while the other 14 are receivers. The receivers are connected through a SP16T solid-state switching matrix that was designed and assembled in-house. 2-port S-parameter measurements were taken with a Vector Network Analyzer from 2.4-2.8 GHz between the transmitter and any one receiver. A rotator with a Styrofoam pedestal was aligned in the center of the octagon to rotate test objects an provide multiple transmitter views.

Figure 26A:
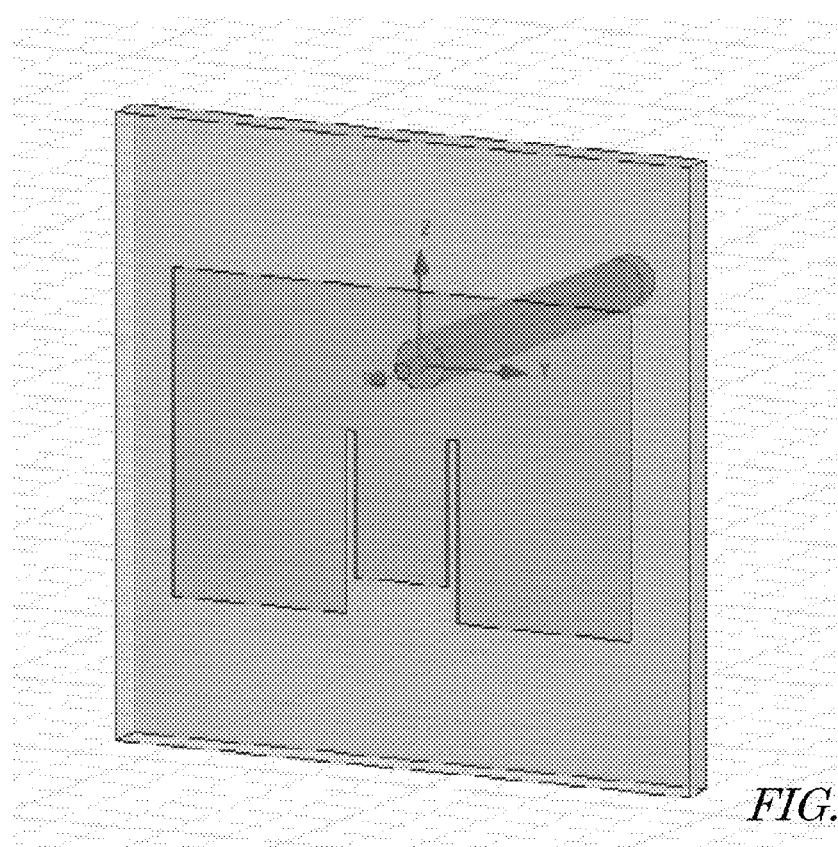
FIG. 26(a) is an HFSS CAD model of an E-patch antenna in vertical polarization.
Figure 26B:
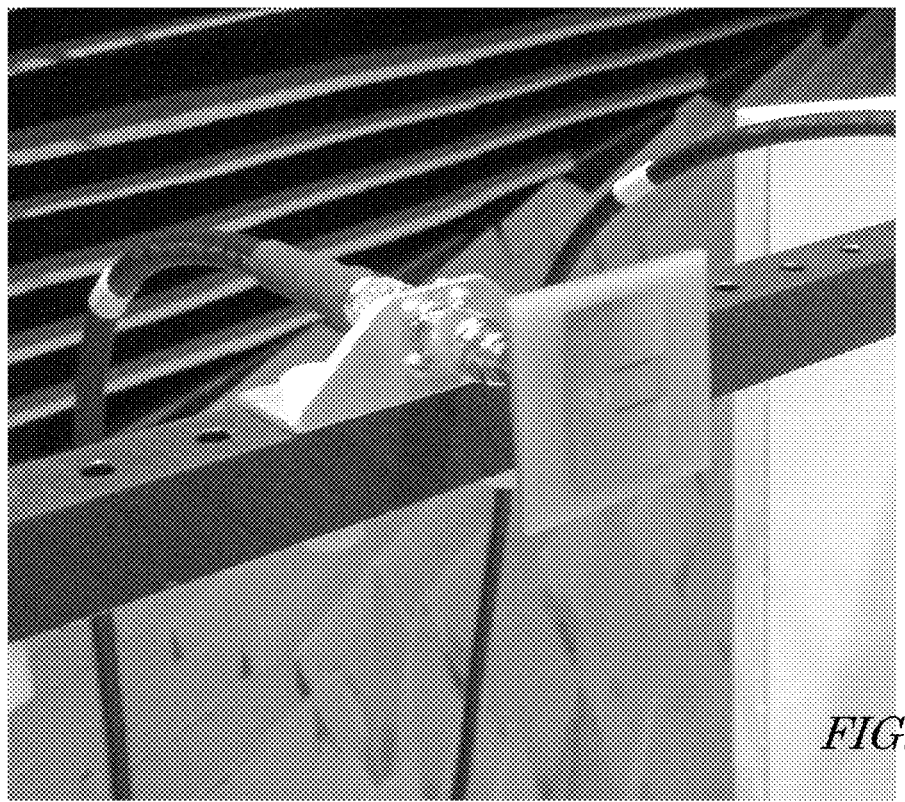
FIG. 26(b) shows an actual antenna mounted in the test setup of FIG. 25 for horizontal polarization.

The antennas where designed and characterized using Ansoft HFSS. The HFSS CAD model is shown in FIG. 26. The antennas are E-patch antennas, where the dimensions of the patch are 4 cm×2.5 cm on a 5 cm×5 cm substrate of ⅛" FR4. The size of the patch gaps and location of the feed were optimized to give a −10 dB bandwidth between 2.45-2.75 GHz.

Figure 27:
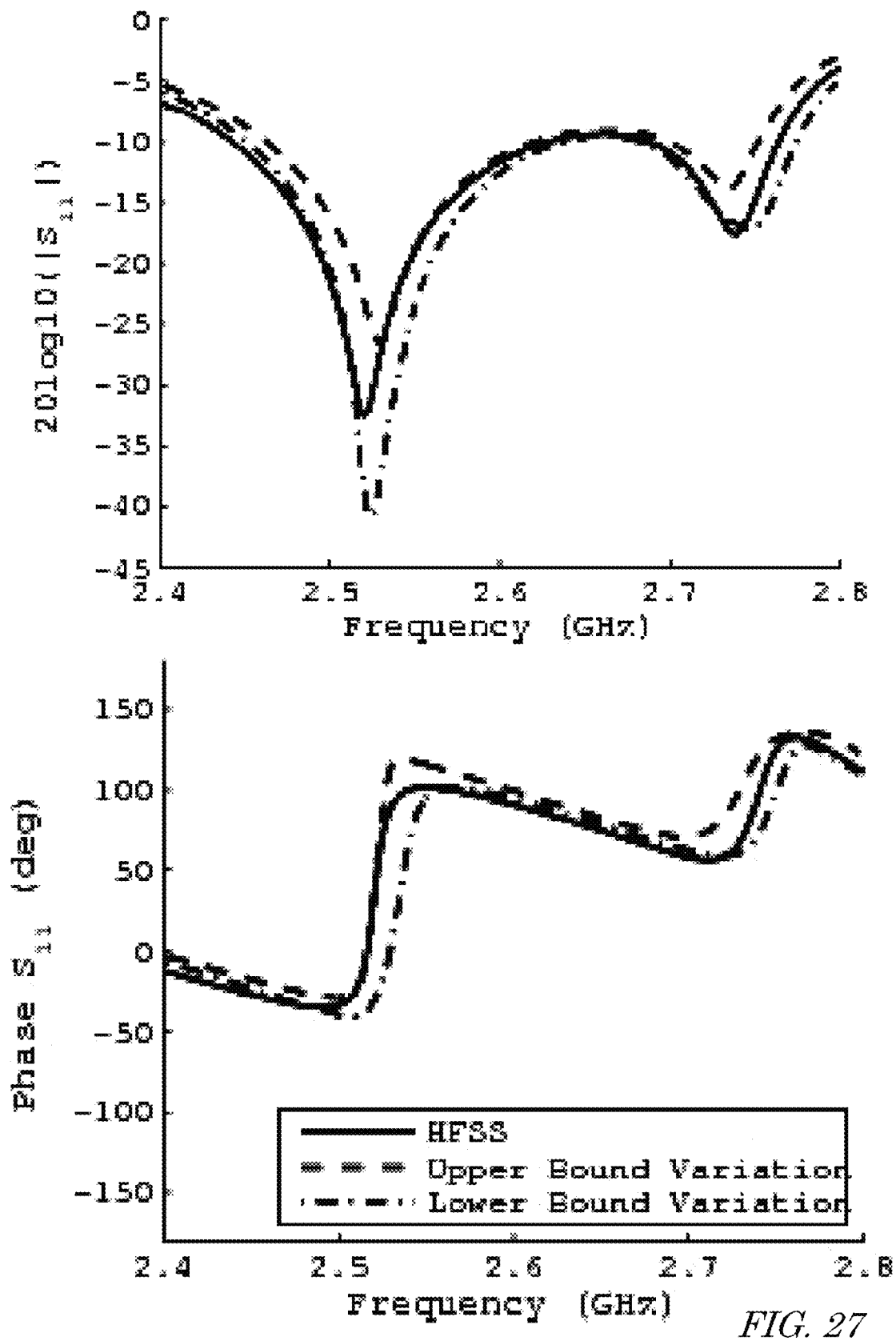
FIG. 27 shows magnitude and phase plots of the simulated and measured $S_{11}$ S-parameters for the E-patch antennas used in the setup of FIG. 25.

Before completing the characterization, measured and simulated $S_{11}$ of the antennas are compared in isolation before being used in the setup. FIG. 27 shows the magnitude and phase of simulated $S_{11}$ as well as the upper and lower-bounds of measured $S_{11}$ across all 15 antennas used in the setup. The overall phase variation was less than 10 degrees, except near the two resonances, even though the magnitude can differ by as much as 6 dB. Based on experience with this characterization technique, apparently large differences in measured and simulated $S_{11}$ do not directly translate to large differences between measured and predicted $S_{21}$, so the antennas are treated identically. Also, the S-parameter reference plane of the CAD model matched that used by the VNA in measurement (see VNA Calibration below). In FIG. 27, the solid line is simulated $S_{11}$ from HFSS, the dashed and dotted lines represent the upper and lower bounds, respectively, of the variation of measured $S_{11}$ across all 15 antennas before being used in the setup.

Figure 28:
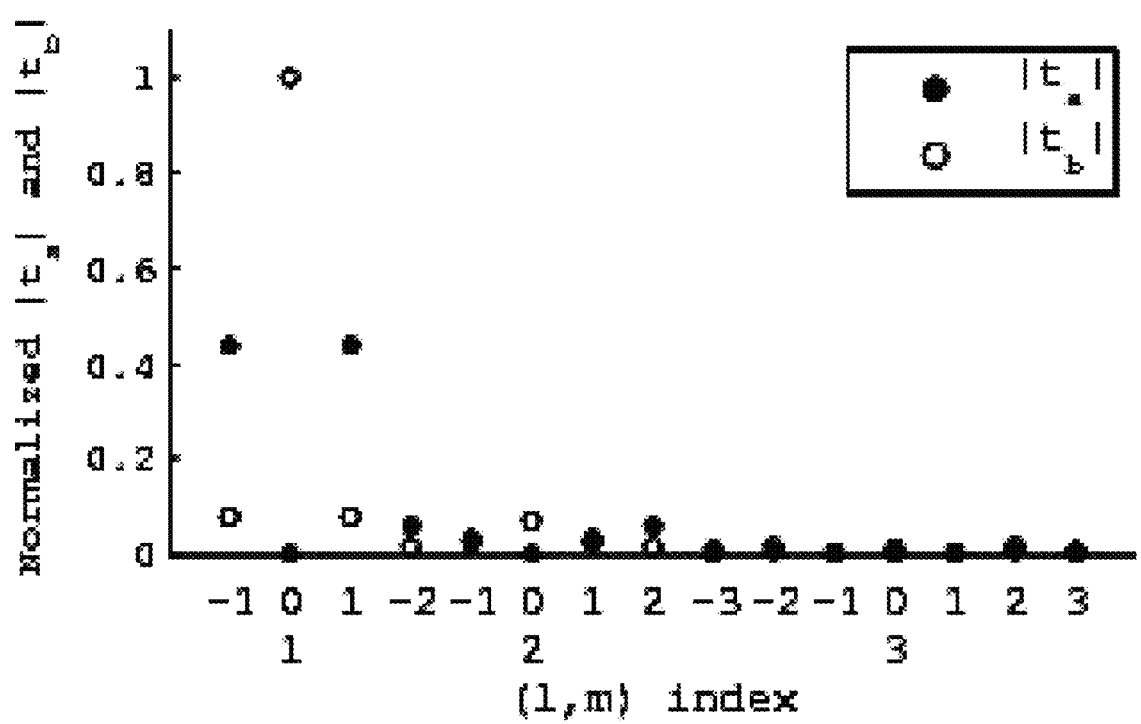
FIG. 28 is a plot of normalized magnitudes of transit coefficients for the E-patch antennas used in the setup of FIG. 25.
Figure 29:
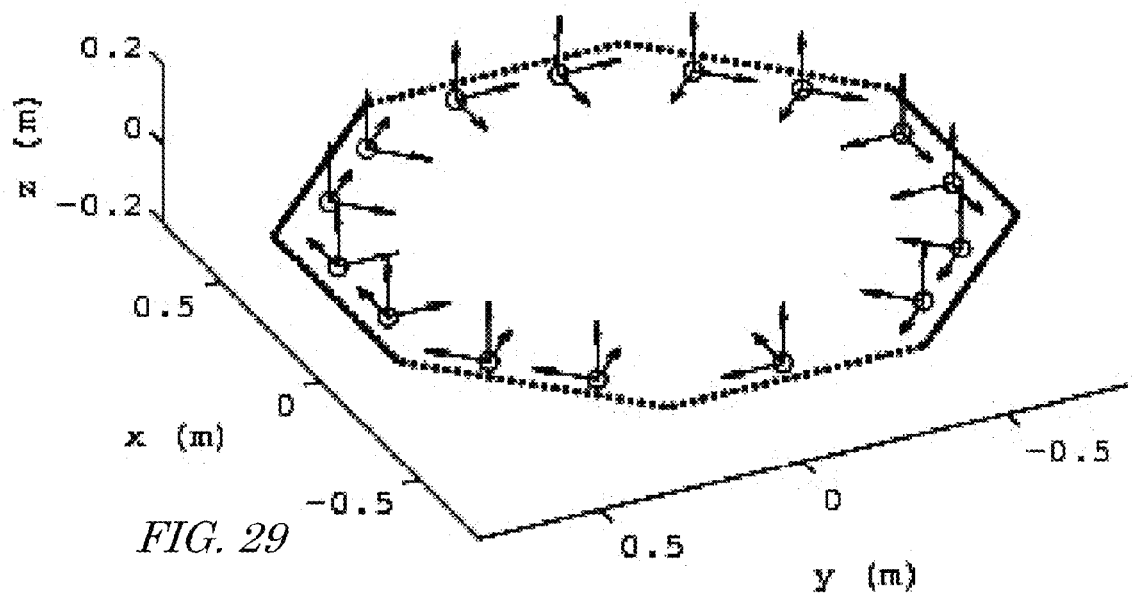
FIG. 29 is a schematic of ideal antenna reference frame positions and rotations for the antenna setup of FIG. 25.

When estimating the transmit coefficients, the coordinate origin of the antenna reference frame was chosen as the intersection of the center conductor and the ground plane of the patch. In simulation, the radiated electric field was computed relative to this origin on four spheres with radii of [20 50 100 150] cm at 2500 points uniformly on each sphere. The antenna transmit coefficients were estimated up to harmonics of l=5 for all m. The transmit coefficients at 2.5 GHz up to l=3 are shown in FIG. 28. Most of the field information is captured in the first few l, showing the dipole nature of the antenna. The transmit coefficients for antennas in rotated frames were obtained using the rotation addition theorem for vector spherical harmonics, which allows one to compute the incident field for any antenna location and polarization from the same set of transmit coefficients.

The patch antennas are linearly polarized, so two principal polarizations were tested, vertical and horizontal relative to the plane of the antennas, labeled V and H. To achieve different polarizations, the antennas were rotated by hand about the connector and adjusted with a hand level.

The locations of the antenna reference frames in the setup were determined by measuring their relative locations on the nylon octagon. The structure was octagonal to within 5 mm at the widest points. A schematic of the ideal positions and rotations of the antenna reference frames are shown. The receivers 1-14 are numbered counterclockwise from the transmitter as viewed from above.

The receivers were connected through a SP16T solid-state switching matrix that was designed and assembled in house. The switching matrix has two layers of SP4T Hittite HMC241QS16 non-reflective switches controlled with a computer parallel port. The operating band of the switching matrix is between 0.1-3 GHz. The overall loss of a path in the switching matrix is no worse than −2 dB across the band. The switch path was measured in isolation to be better than −35 dB between 1-3 GHz, which means scattered field measurements between two antennas that differ by this much cannot be reliably measured.

2-port VNA calibrations were accomplished between the transmitter and each receiver. The S-parameter reference planes were calibrated to the points where the antennas were connected to the mounts. These reference planes are identical to that in the HFSSCAD model used to solve for the antenna transmit coefficients thus making the measurements and antenna characterization consistent.

To calibrate the VNA, the antennas were first removed from their mounts. While calibrating, the unused ports were left open with the rational that the one-way switch isolation of −35 dB provided sufficient matching to the open ports. Short-open-load measurements for a 1-port calibration were taken for each antenna. Next, the through path between the transmitter and each receiver was measured with a 10' SMA cable. In software, the 1-port and through measurements were combined to accomplish a 2-port SOLT calibration with arbitrary through between the transmitter and each receiver. Although standard 2-port calibrations would have sufficed, this technique was developed with an eye toward multi-transmitter systems.

Figure 30:
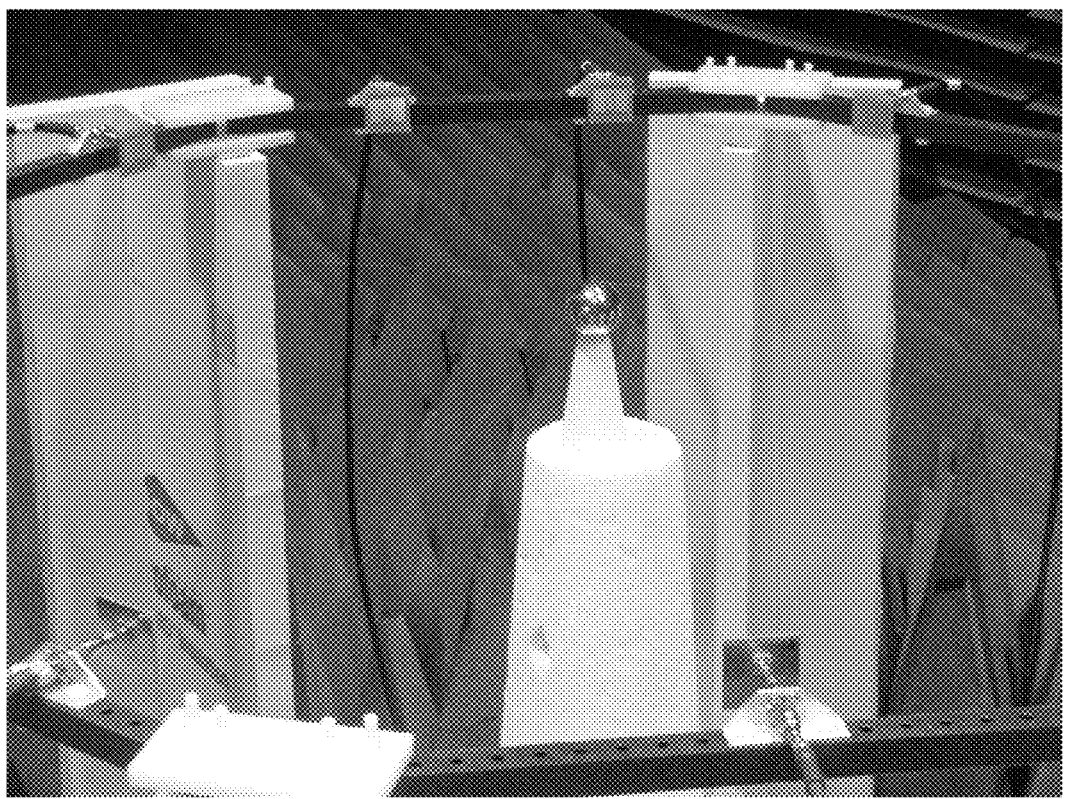
FIG. 30 shows a test setup for testing the antenna model using a conducting sphere centered in the antenna array.

Before collecting data for inversion, the setup was tested by comparing measured and predicted $S_{21}$ of the incident, total, and scattered fields for the conducting sphere in FIG. 30, using a propagation model. Both VV and HH polarizations were tested. Note that the sphere is not used as a calibration target, it is only used to confirm the accuracy of the antenna characterization and our knowledge of the antenna reference frames.

Figure 31:
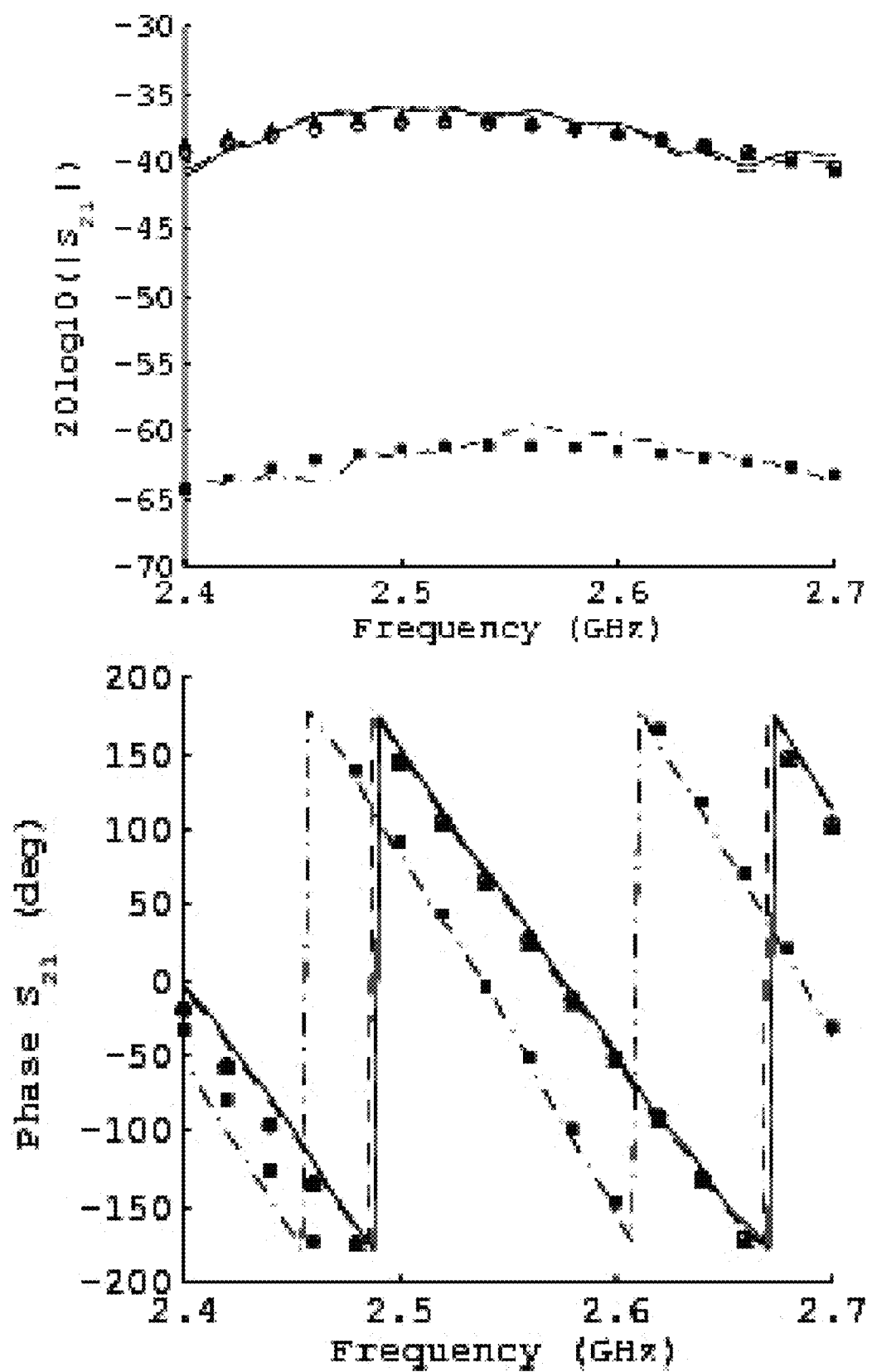
FIG. 31 shows magnitude and phase plots of measured and predicted $S_{21}$ of the incident, total and scattered fields of the conducting sphere of FIG. 30.

FIG. 31 shows the measured and predicted $S_{21}$ for the VV polarization of the incident, total and scattered field of a conducting sphere measured between the transmitter and receiver 11. The magnitude agrees two within 2 dB and the phase is accurate to better than 20 degrees across the band from 2.4-2.7 GHz. Similar results were obtained for each transmitter-receiver pair and HH polarization. Given the accuracy of the predicted phase, the incident field, when computed with Eqn. (10), is expected to be accurate to better than $\lambda/10$ throughout the object domain. In FIG. 31, magnitude and phase of measured and predicted $S_{21}$ of the incident, total and scattered fields of the conducting sphere in FIG. 30 between the transmitter and receiver number 11. FIG. 31(a) shows magnitude, FIG. 31(b) shows phase. Solid line and circles: measured and predicted incident field $S_{21}$. Dashed line and triangles: measured and predicted total field $S_{21}$. Dash-dot line and squares: measured and predicted scattered field $S_{21}$. The incident and total field $S_{21}$ appear nearly identical on these scales.

Scattered field cross pole measurements for small objects were found not consistent with model predictions, likely because their magnitude was on the order of the multiple scattering throughout the setup, and so we excluded cross pole measurements from future measurements.

In the probabilistic interpretation of the cost function, the data vector d represents the mean of the forward model Gaussian distributions. The data are assumed to be independent, so the data inverse covariance operator is a diagonal matrix with inverse variances given along the diagonal. The distributions represent Gaussian random noise in the measurement.

The values of the means and variances for these distributions are determined directly from the statistics of the measurements. For instance, in radar, many data takes of the same voltage signal are oftentimes averaged to improve the signal to noise ratio. This average, in addition to the variance, are precisely the quantities used for the entries of the inverse covariance matrix. As an aside, the data vectors in the cost function are complex, but are assigned a single value for the variance. This treatment automatically assumes that the real and imaginary parts of the data are independent with the same value for the variance.

Figure 32:
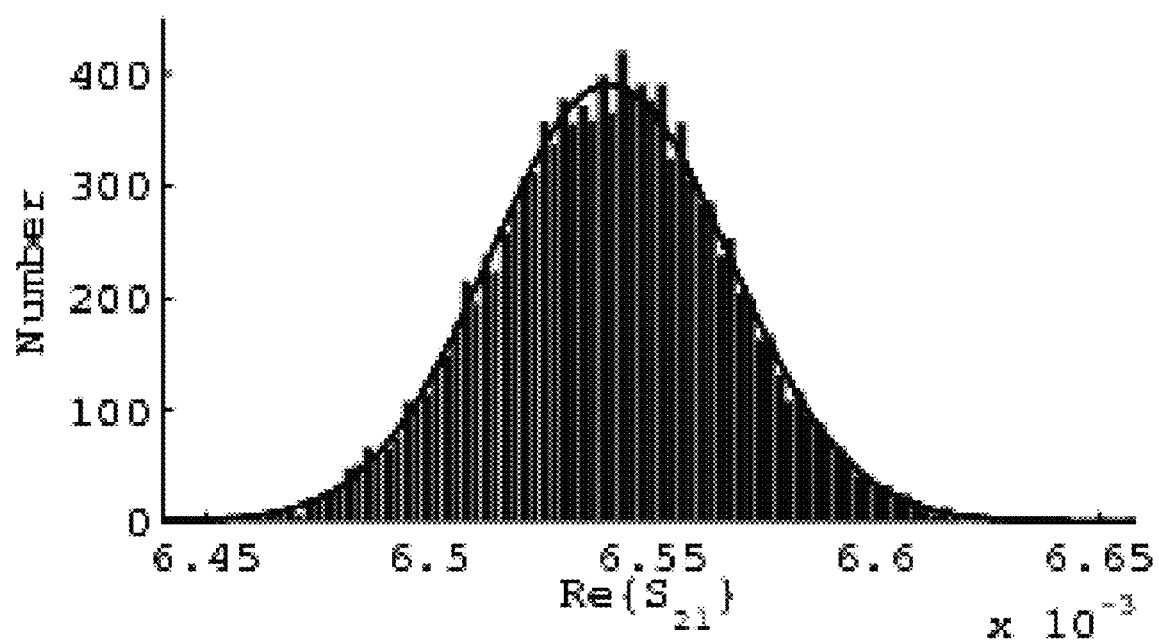
FIG. 32 is a histogram of the real part of $S_{21}$ of the incident field of the receiving antenna located across from the transmitting antenna.
Figure 33A:
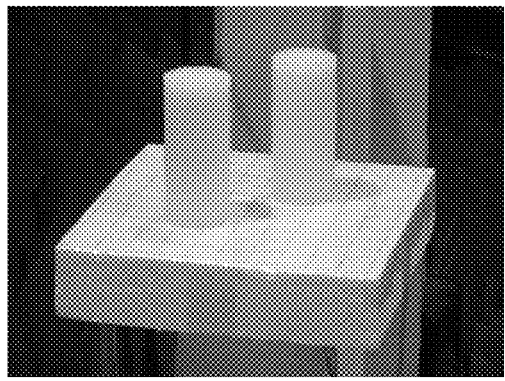
FIG. 33(a) is a photo of the target objects and FIGS. 33(b)-33(d) show reconstructed relative permittivities at different conjugate gradient iterations carried out during the inverse scattering method of FIG. 23.
Figure 33B:
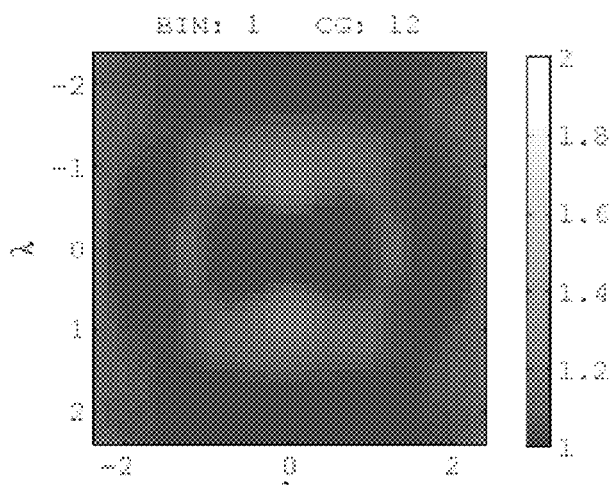
Figure 33C:
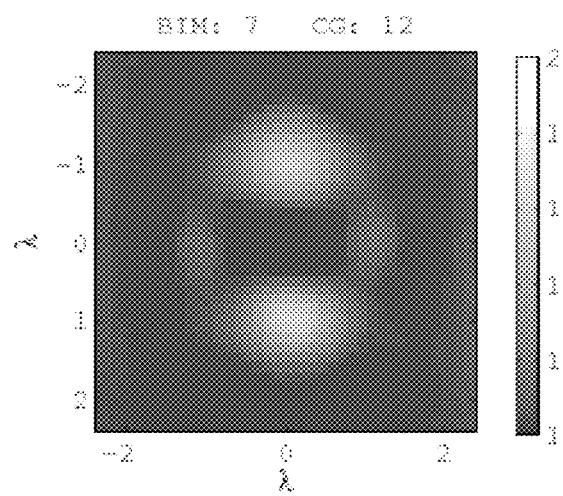
Figure 33D:
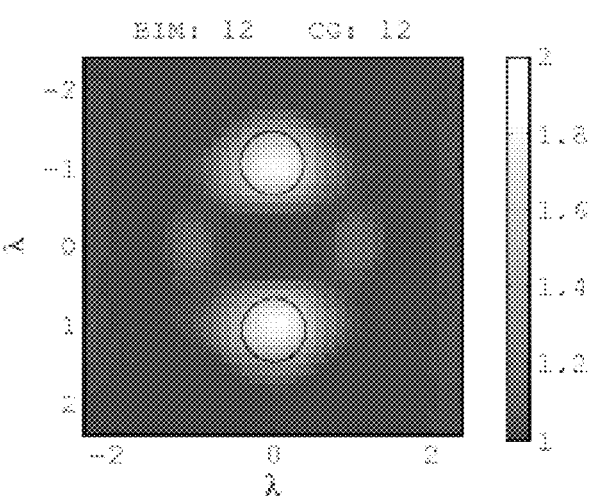

To determine the noise of the system, 12000 individual $S_{21}$ measurements of the incident field were saved for each receiver. A histogram of the real part of a typical $S_{21}$ measurement at 2.5 GHz is shown in FIG. 32. The random noise is clearly Gaussian with a standard deviation of 2.68e-05, which is approximately −91 dB. The noise includes the effects of the VNA, the switch, and the background. Results at each receiver and each frequency varied between −88 dB and −92 dB, for both real and imaginary parts of $S_{21}$. It was enough to assign a single variance with a value of −90 dB for all the data, which is the value used when forming the images. In FIG. 32, there is shown a histogram of the real part of $S_{21}$ for the incident field of receiver 8 (across from the transmitter) at 2.5 GHz. The solid line is a Gaussian distribution with the same mean and variance of the data. The noise is equal to approximately −91 dB. Similar results are obtained for all measurements.

When taking data for inversion, a full histogram was not completed due to time constraints. For the setup, 20 samples of each measurement were averaged to use for the mean, and the value of the variance above was used for the noise. Also, the noise is unaffected by the polarization because the antennas were rotated by hand.

The images formed are 2D cross sections of finite cylindrical objects using the full 3D inverse scattering algorithm. The cylindrical nature of the objects was used only as a priori information, where the vertical extent of the object was known. This is at least partially because it is difficult to collect enough data in a 2D source geometry to make the inverse problem over determined for a fully 3D object. Furthermore, the point spread function of a 2D source geometry is elongated in the vertical direction, which would corrupt 3D images. Also, it is simply not correct to use a 2D inversion algorithm in a 3D experiment, unless the objects are very tall and the incident fields are nearly cylindrical or plane waves. Thus, the full 3D forward solver and inversion algorithm are used to form images of 2D cross sections.

Although the inversion algorithm for contrasts of both permittivity and conductivity were derived, only images of permittivity were formed at this time, because the objects consist of plastic cylinders and bars. Conductivity was included in the derivation for future reference.

The object domain used for the forward solver and the scattered field volume integral was 30×30×30 cm. This was large enough to encompass rotated objects which had heights of 15 cm. The domain was meshed at $\lambda/8$ in a material with relative permittivity of 3. This gave a domain that is 41×41× 41 pixels on a side. The discretization size was chosen so that the number of pixels of the zero padded domains for FFTs in the BCGFFT were 2N−1=81, which has a prime factorization of $3^4$. The 2D cross section, and thus the number of unknowns in the inverse problem for a single contrast function, has 41×41=1681 pixels.

The objects were rotated to 72 positions in 5 degree increments. Using data from all 14 receivers gives 1008 complex data points per frequency for a single polarization. Thus reconstructions of permittivity with only one frequency have effectively 2016 data points, making the inverse problem overdetermined.

The antenna transmit coefficients were found at 20 frequencies between 2.4 and 2.7 GHz, and there is the option of using any of these frequencies in the inversion algorithm. After experimenting with different combinations of frequencies, it was found that using a single frequency, or only a few frequencies yielded the best results in terms of reconstructing the object shapes and contrasts.

In the cost function, the inverse covariance operators were taken to be diagonal, meaning both the data and, separately, the image pixels, are independent. The value for the data variance was the noise. The standard deviations of the model parameters (i.e., relative permittivity) was set to 10, which is sufficient to regularize the problem without penalizing high contrasts.

Each image is formed with 12 iterations of the BIM. An iteration consists of one run of the forward solver and 12 conjugate gradient iterations to minimize the cost function. The computation time and storage was equivalent to 2 hours and 0.5 GB RAM per number of frequencies used for code written in Fortran on a Linux desktop.

EXAMPLE 1

Figure 34A:
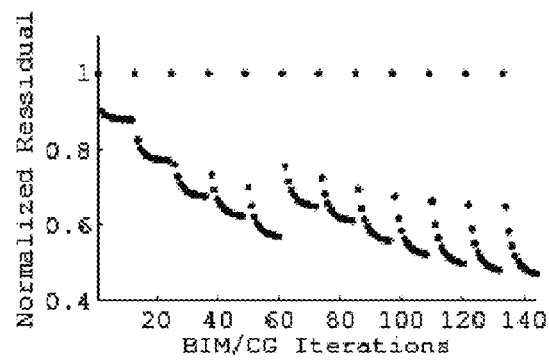
FIG. 34(a) shows a normalized residual for conjugate gradient iterations for each successive BMI iteration carried out as a part of the inverse scattering method of FIG. 23.
Figure 34B:
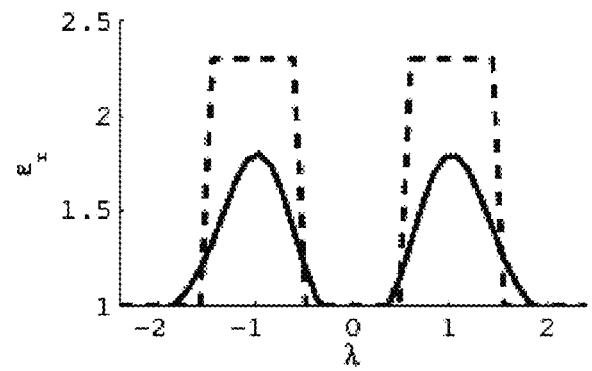
FIG. 34(b) shows a vertical cut of the actual and reconstructed relative permittivity through the center of the two target objects shown in FIG. 33(a)

A pair of Delrin rods, pictured in FIG. 33. The rods are approximated 5 cm in diameter, 15 cm tall, and have a relative permittivity of 2.3. Also shown are the reconstructions at BIM iterations. The images were formed with VV data with the three frequencies [2.5, 2.6, 2.7] GHz. An outline of the locations of the actual objects is superimposed on the final image, which were measured during the experiment. The objects are detected at the correct locations, and the peak relative permittivity in the last iteration is approximately 1.8. FIG. 34 shows a cross section of the actual and reconstructed permittivities. Also shown is the residual during the conjugate gradient minimization for each BIM iteration. The residual resets at the beginning of each iteration because the minimization is begun with a zero object. The behavior of the residual at the 6th iteration is attributed either to the nonlinearity of the problem or error accumulation.

In FIG. 33, there is shown reconstructed relative permittivity at 4 iterations of the BIM after 12 conjugate gradient iterations each using VV polarization data: a) Photo of Delrin rods, b) BIM iteration 1, i.e. Born approximation, c) iteration 7, and d) iteration 12. The wavelength is that in a material of $\in_r=3$. In FIG. 34, there is shown: a) normalized residual for the conjugate gradient iterations for each successive BIM iteration, and b) vertical cut of the actual and reconstructed relative permittivity through the center of the two objects.

Figure 35A:
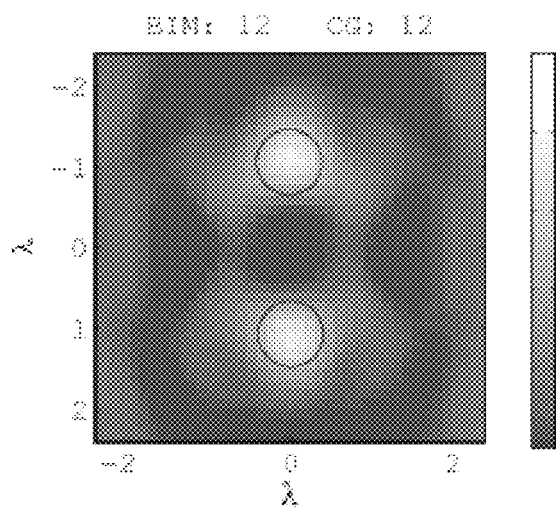
FIG. 35(a) shows a reconstructed image of the two target objects using HH polarization data.
Figure 35B:
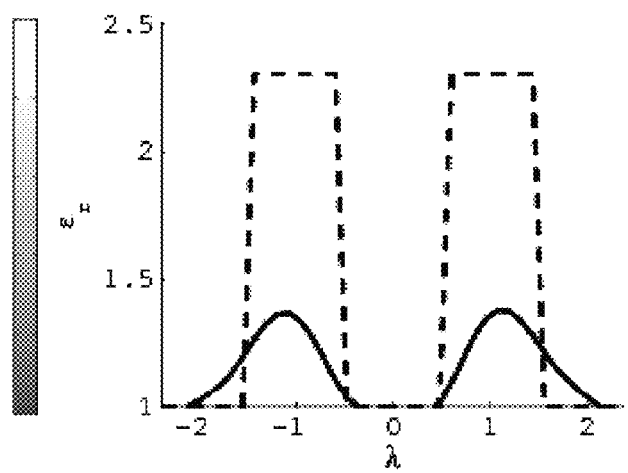
FIG. 35(b) a vertical cut of the actual and reconstructed relative permittivity through the center of the two target objects shown in FIG. 33(a)
Figure 36A:
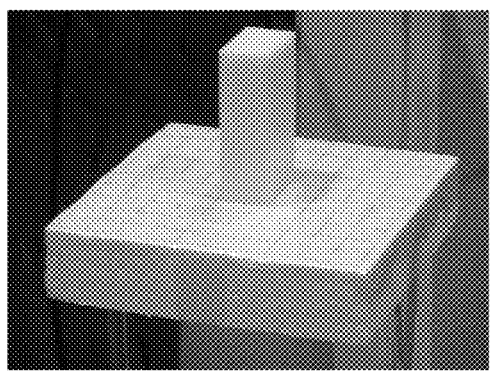
FIG. 36(a) is a photo of the target objects.
Figure 36B:
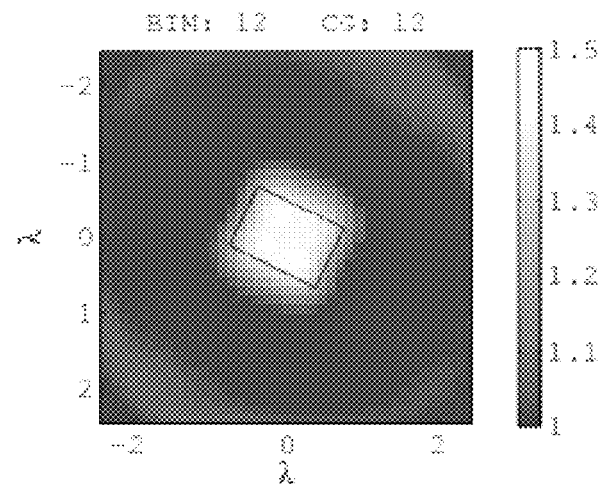
FIG. 36(b) shows a reconstructed image of the relative permittivity.
Figure 36C:
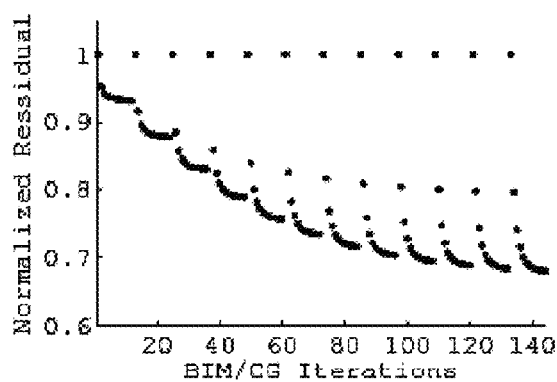
FIG. 36(c) shows normalized residual for all BIM iterations.
Figure 36D:
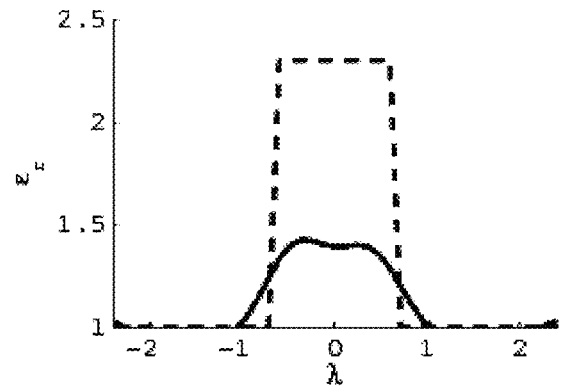
FIG. 36(d) shows a horizontal cut through the middle of the image for the actual and reconstructed object.
Figure 37A:
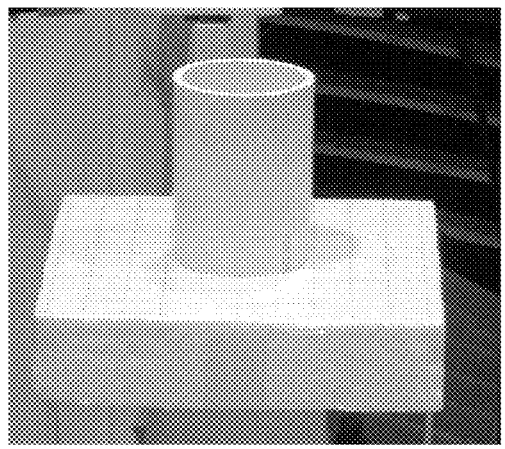
FIGS. 37(a) and 37(c) show PCV rings (tubes) used as target objects and FIGS. 37(b) and 37(d) show respective reconstructed relative permittivities after twelve BIM iterations.
Figure 37B:
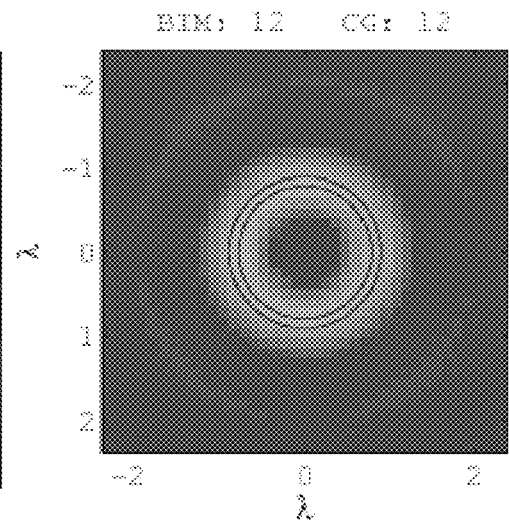
Figure 37C:
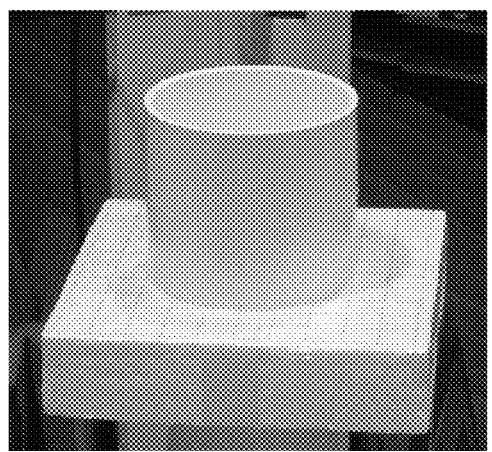
Figure 37D:
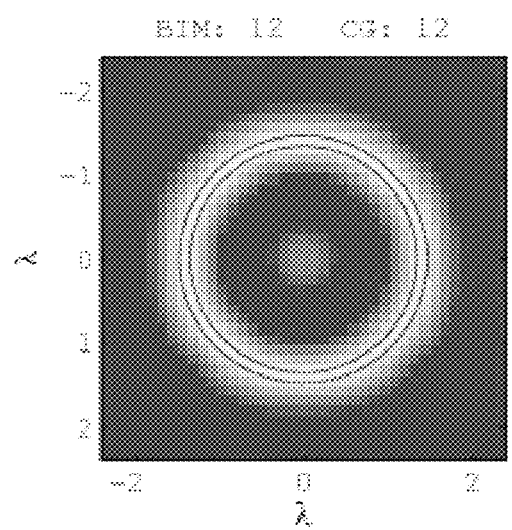
Figure 39A:
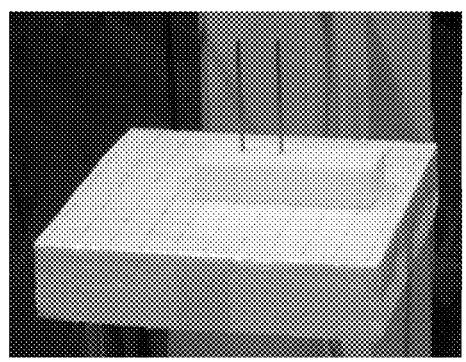
FIGS. 39(a) and 39(c) show target object setups using two metal rods at different spacings.
Figure 39B:
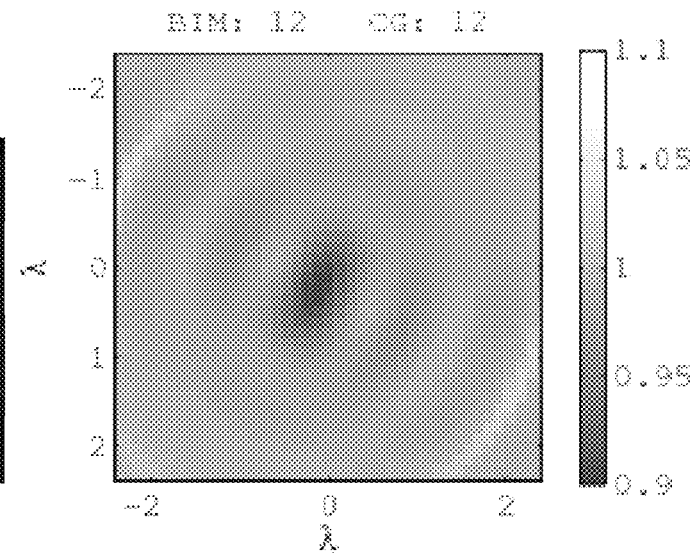
FIGS. 39(b) and 39(d) show respective reconstructed relative permittivities after twelve BIM iterations.
Figure 39C:
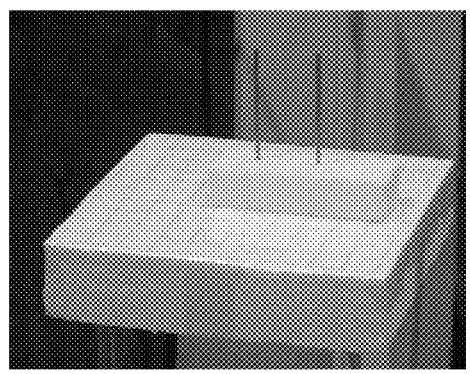
Figure 39D:
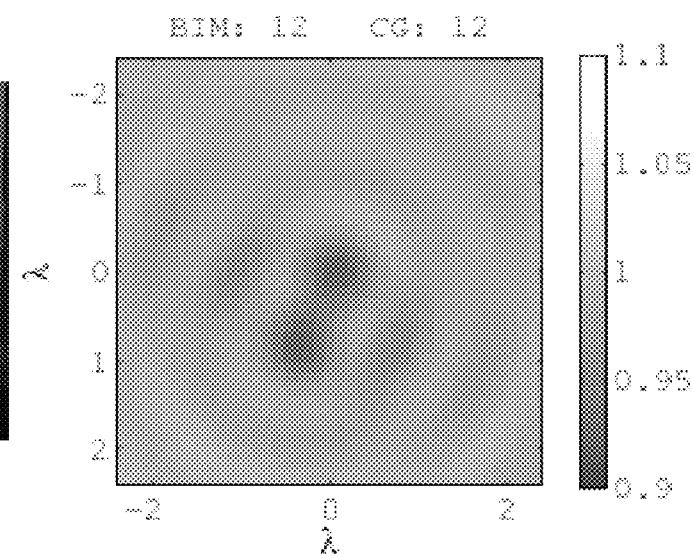

Next, using the same parameters, an image of the two Delrin rods was formed using HH data, shown in FIG. 35. The objects are detected but the contrast is very underestimated. In FIG. 35, there is shown: a) reconstructed imagine of two Delrin rods using HH polarization data, and b) vertical cut of the actual and reconstructed relative permittivity through the center of the two objects.

EXAMPLE 2

A Delrin block, shown in FIG. 36. The reconstruction after 12 BIM iterations using VV data at 2.5 GHz. Also shown is an outline of the actual block. The block is 5.5 cm×8 cm×15 cm, with a relative permittivity of 2.3. While the shape is reasonably recovered, the contrast is only 40% of the actual. This is attributed to the fact that the block is electrically small, and the peak contrast of subwavelength objects are often not recovered given the type of regularization used in this algorithm. In FIG. 36, there is shown: a) photo of Delrin block, b) reconstructed relative permittivity after 12 BIM iterations, an outline of the actual block is superimposed on the image, c) horizontal cut through the middle of the image for the actual and reconstructed object, and d) normalized residual for all iterations.

EXAMPLE 3

Two different sized PVC rings, shown in FIG. 37. The rings had diameters of 10 cm and 17 cm, respectively, both with thicknesses of 7.5 mm. The reconstruction after 12 BIM iterations using VV data and the three frequencies [2.5, 2.6, 2.7] GHz is also shown as well as an outline of each ring. The rings have a relative permittivity of 2.7. The overall shape of the rings is recovered well, but the peak contrast is underestimated due mostly to resolution limits, because the ring thickness is about $\lambda/8$. The apparent object in the center of the large ring is an artifact. In FIG. 37, there is shown: a) and c) photos of PVC rings, and b) and d) reconstructed relative permittivity after 12 BIM iterations. An outline of the actual rings are superimposed on the images.

EXAMPLE 4

For this example, a 5 cm diameter PVC rod was enclosed in two different rings, shown in FIG. 38. The first ring is the small PVC ring used in Example 3. The second ring is a large cardboard ring with a 18 cm diameter and 5 mm thickness, where this ring and rod combination is also offset from the center. The relative permittivity of the PVC rod is 2.7. The reconstruction after 12 BIM iterations using VV data and the three frequencies [2.5, 2.6, 2.7] GHz is shown in FIG. 38 as well as an outline of the actual locations of the ring and the PVC rod. Both the rod and the ring are distinguishable in each case. The recovered peak relative permittivity of the rod in each image is 2.2. The cardboard ring is faintly visible, even with a thickness of $\lambda/12$. In FIG. 38, there is shown: a) photo of ring and rod combination, and b) reconstructed relative permittivity after 12 BIM iterations. An outline of the inner and outer diameter of the ring as well as the PVC rod is superimposed on the image.

EXAMPLE 5

In this example two very thin metal rods were imaged to study resolution, with the rational that metal rods act as impulses in both space and permittivity. The rods are held in a Styrofoam mount, as shown in FIG. 39. The images were formed at 2.5 GHz with VV polarization data. Also shown are the reconstructed images for rods separated by 4 cm and 6 cm respectively. Although the algorithm completed all 12 iterations, the first iteration, which is the Born approximation, yielded relative permittivity values less than 1. Permittivities less than 1 are set to zero before running the forward solver, so, this image remained effectively unupdated beyond the first iteration, meaning only the Born approximation was used in the reconstruction. This fact, together with the large number of angular samples used, makes this particular reconstruction is very similar to diffraction tomography and explains the ringing artifacts which are a common feature of diffraction tomography. Despite the fact that the permittivity values have no physical meaning, the rods are distinguishable in the images at a 6 cm separation. This separation is $\lambda/2$ at 2.5 GHz in free space, which is consistent with the resolution limits of the Born approximation. In FIG. 39, there is shown: a) and c) photo of the metal rods at separates of 4 cm and 6 cm, respectively, and b) and d) reconstructed relative permittivity after 12 BIM iterations. Note that the relative permittivity is less than 1 at the locations of the rods.

EXAMPLE 6

There were some objects that could not be recovered by the algorithm. Similar to Example 4, the PVC rod enclosed by the 17 cm PVC ring was attempted to be imaged, shown in FIG. 40. However, the algorithm did not completely recover the objects properly after 12 iterations. In FIG. 40, there is shown: a) photo of ring and rod combination in the setup, and b) reconstructed relative permittivity after 12 BIM iterations. The algorithm did not completely recover this object.

EXAMPLE 7

A combination of objects were attempted to be imaged, as shown in FIG. 41. The objects are a Delrin rod and block each having a relative permittivity of 2.3. The algorithm did not completely recover the contrasts correctly. To diagnose the problem, the algorithm was run with synthetic data. The forward model still includes the antenna characterization and the reconstruction represents the image best expected for the same state of the algorithm. The ideal object and its reconstruction are shown in FIG. 42. The image shows that the algorithm is capable of recovering this object to a point, which suggests that errors in modeling are too large for the object to be recovered from experimental data, without additional a priori knowledge. In FIG. 41, there is shown: a) photo of Delrin rod and block, and b) reconstructed relative permittivity after 12 iterations. An outline of the actual objects is shown. The algorithm could not completely recover the contrasts of the objects. In FIG. 42, there is shown: a) objects used to generate synthetic scattered field data, and b) reconstruction using synthetic data.

Next the algorithm was tested assuming that the shapes of the objects were known a priori, but not the contrasts. This regularization was accomplished using the model inverse covariance matrix. The pixels were correlated within each homogeneous region with themselves, but leave the regions uncorrelated. The background was assumed to be free space and so set the variance of these pixels to be nearly zero. The value for the variance of pixels in the two dielectric regions was 10. FIG. 43 shows the reconstructions for synthetic and experimental data. The reconstruction from synthetic data recovers the contrast value quite well, while the experimental data underestimates the contrast value of the cylinder with the block faintly visible. In FIG. 43, image reconstructions from synthetic and experimental data using covariance operators to correlate pixels of homogeneous regions are shown, including: a) reconstruction using synthetic data, b) reconstruction using experimental data.

In general, the inversion algorithm underestimated the contrast values of the dielectric objects and could not completely recover objects with too high a contrast. Examples 1-4 suggest that the algorithm as developed can recover the general shape of objects which have lower contrast, though the reconstructed contrasts are underestimated. Example 5 shows an achievable resolution of at least λ/2, even though the images are non-physical. Examples 6 and 7 show that the algorithm broke down for high contrast objects in close proximity to one another. Possible explanations for these observations are as follows.

Because targets are not used to calibrate the scattered field measurements, there was reliance on the numeric antenna characterization to link the S-parameter measurements to the physics of the algorithms. Therefore any numeric or systematic errors in the antenna simulation, construction, or alignment as well as setup construction or unaccounted multiple scattering, may propagate through the algorithm without being corrected. Also, while the overall system enables imaging without prior targets, making it more realistic, the algorithm is forced to form images despite uncorrected discrepancies between the forward model and the physical setup, which will tend to degrade the image.

Also, the inverse scattering problem is nonlinear and non-unique, both of which are due to, but not exclusively due to, the source geometry and the strength of the scattering within the objects. In general, the BIM may be capable of recovering contrasts as high as 3:1 in simulation for sources which surround the object in 2D or 3D. For the experiment, a 3D algorithm was used with a 2D source geometry, which means the space of all possible measurements is already incomplete. Next, high contrast objects or objects in close proximity, as in Examples 6 and 7, where the object scattering is more nonlinear, were only partially recovered or not recovered at all. The multiple scattering between high contrast objects is usually reported to be a property which full-wave algorithms can exploit by using a forward solver. However, in this case it is possible that the modeling errors were too great, and the source geometry too sparse, for the algorithm to take advantage of this and recover objects with strong nonlinear scattering. In principle, this can be helped with more a priori information such as shape, but, as tested in Example 7, even this was not enough to alter the final image for that case.

In general, a full-wave antenna model and characterization for experimental inverse scattering has been introduced and demonstrated. The antenna model is based on the source scattering matrix formulation. The antenna model was used to modify the traditional inverse scattering volume integral equations so that they are consistent with VNA S-parameter measurements. This absolute source characterization allowed a direct comparison of measurements to model predictions in the inverse scattering algorithm without using calibration targets in experiment. The use of the BIM was successfully demonstrated in experiment by reconstructing 2D dielectric profiles of 3D objects. The inversion algorithm recovered object shape and contrast with mixed success. A priori knowledge of random noise, contrast limits, and shape was shown to regularize the inverse problem in a covariance-based cost function. Application of this algorithm and characterization to 3D source geometries and adapting these techniques to microwave and ultrasound medical imaging applications is certainly envisioned.

The cost function discussed above may attempt to minimize a weighted least-squares cost functional of a linear operator using conjugate gradients. Skilled artisans will appreciate that a variety of different cost functions and the like may be employed by the present method, including those disclosed in: A. Tarantola, *Inverse Problem Theory*, Philadelphia: SIAM, 2005, the entire contents of which are incorporated herein by reference. In addition, the step length discussed above may be solved by substituting the model update vector into the cost function, and minimize with respect to the step length. A similar result is disclosed in P. M van der Berg, R. E. Klienman, "*A contrast source inversion method,*" *Inverse Prob.*, vol. 13, pp. 1607-1620, 1997, the entire contents of which are incorporated herein by reference.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An imaging method, comprising the steps of:
    (a) determining an incident field due to voltage excitation on a transmitting antenna;
    (b) using the incident field and a volume integral equation (VIE) to determine a total field;
    (c) predicting voltage ratio measurement at a receiving antenna by using the volume integral equation (VIE), including a vector Green's function, that directly converts electromagnetic vector field quantities in a computational domain to scalar quantities representing measured voltages at terminals of one or more receiving antennas;
    (d) collecting voltage ratio measurements from the one or more receiving antennas;
    (e) comparing the predicted voltage ratio measurements to the collected voltage ratio measurements to determine one or more properties of an object being evaluated; and
    (f) generating an image of the object being evaluated.

2. The imaging method of claim 1, wherein step (c) further comprises converting the volume integral equation (VIE) to S-parameters using the vector Green's function.

3. The imaging method of claim 1, wherein the vector Green's function is a kernel within the volume integral equation (VIE).

4. The imaging method of claim 1, further comprising the step of transmitting radiation towards an object prior to step (a).

5. An imaging system, comprising:
    at least one transmitting antenna for transmitting probing field radiation towards a target object;
    at least one receiving antenna for receiving at least some of the radiation that is scattered by the target object; and
    a computer-based data collection system that operates to determine an incident field related to the transmitted radiation, determine a total field, directly compute a predicted receiving antenna voltage ratio measurement using a volume integral equation (VIE) that includes a vector Green's function converting electromagnetic vector field quantities in a computational domain to scalar quantities representing measured voltages at terminals of the receiving antenna, receive actual voltage ratio measurements from the one or more receiving antennas, determine at least one property of the target object using the computed voltage ratio measurement and the actual voltage ratio measurements, and generate an image of the target object being evaluated.

6. The imaging system of claim 5, further comprising a plurality of the receiving antennas, wherein the data collection system includes a switching matrix connected to the receiving antennas.

7. The imaging system of claim 5, wherein the data collection system functions as a multistatic radar system connected to the antennas.

8. The imaging system of claim 7, wherein the data collection system includes a computer that is connected to the radar system via a radar control, and wherein the radar system provides radar data received from the one or more receiving antennas to the computer via a data collection interface.

9. The imaging system of claim 5, wherein the antennas and data collection system are configured to permit imaging of soft animal tissues.

10. The imaging system of claim 5, wherein the data collection system operates to convert the volume integral equation (VIE) to S-parameters using the vector Green's function.

11. The imaging system of claim 5, wherein the vector Green's function is a kernel within the volume integral equation (VIE).

* * * * *